United States Patent
Gan et al.

(10) Patent No.: US 11,575,482 B2
(45) Date of Patent: Feb. 7, 2023

(54) COMMUNICATION METHOD, COMMUNICATION APPARATUS, AND COMMUNICATION DEVICE

(71) Applicant: Huawei Technologies Co., Ltd., Shenzhen (CN)

(72) Inventors: Ming Gan, Shenzhen (CN); Wei Lin, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 17/141,676

(22) Filed: Jan. 5, 2021

(65) Prior Publication Data

US 2021/0126755 A1    Apr. 29, 2021

Related U.S. Application Data

(63) Continuation of application No. PCT/CN2019/094779, filed on Jul. 5, 2019.

(30) Foreign Application Priority Data

Jul. 6, 2018    (CN) .......................... 201810739872.8

(51) Int. Cl.
*H04L 5/00* (2006.01)
*H04L 47/62* (2022.01)
*H04W 84/12* (2009.01)

(52) U.S. Cl.
CPC .......... *H04L 5/0048* (2013.01); *H04L 47/624* (2013.01); *H04W 84/12* (2013.01)

(58) Field of Classification Search
CPC ..... H04L 5/0048; H04L 47/624; H04W 84/12
See application file for complete search history.

(56) References Cited

U.S. PATENT DOCUMENTS

| | | | |
|---|---|---|---|
| 10,129,064 B1* | 11/2018 | Lee | ...................... H04L 27/2618 |
| 2010/0050041 A1 | 2/2010 | Chang et al. | |
| 2016/0112851 A1 | 4/2016 | Li et al. | |
| 2018/0048509 A1 | 2/2018 | Huang et al. | |
| 2018/0091347 A1 | 3/2018 | Lee et al. | |

(Continued)

FOREIGN PATENT DOCUMENTS

| | | |
|---|---|---|
| CN | 102595494 A | 7/2012 |
| CN | 103916353 A | 7/2014 |

(Continued)

OTHER PUBLICATIONS

Zhang, H., et al, "802.11ax Preamble Design and Auto-detection," doc.: IEEE 802.11-15/0579, Jul. 10, 2015, 35 pages, XP068157843.

(Continued)

*Primary Examiner* — Duc C Ho
(74) *Attorney, Agent, or Firm* — Conley Rose, P.C.

(57) ABSTRACT

A communication method includes generating a physical layer protocol data unit (PPDU) including a preamble, where the preamble includes a legacy physical layer preamble and a new physical layer preamble, wherein the new physical layer preamble includes a repeated field that has a preset out-of-order relationship with a preset field of the legacy physical layer preamble in frequency domain. The communication method further includes sending the PPDU.

20 Claims, 10 Drawing Sheets

(56) References Cited

U.S. PATENT DOCUMENTS

2018/0123757 A1    5/2018  Ko et al.
2018/0160429 A1*  6/2018  Seok ................ H04W 72/0453
2019/0306920 A1* 10/2019  Son ................... H04W 74/0808

FOREIGN PATENT DOCUMENTS

| CN | 107409111 A | 11/2017 |
|----|-------------|---------|
| CN | 107645747 A | 1/2018 |
| WO | 2016154951 A1 | 10/2016 |
| WO | 2017073011 A1 | 5/2017 |

OTHER PUBLICATIONS

Hongyuan Zhang, "802.11ax Preamble Design and Auto-detection," IEEE 802.11-15/0579r3, Jul. 10, 2015, 7 pages.

* cited by examiner

| L-STF | L-LTF | L-SIG | RL-SIG | HE-SIGA | HE-SIGB | HE-STF | HE-LTF | Data |

FIG. 3E (Prior Art)

| L-STF | L-LTF | L-SIG | Signature | HE-SIGA | HE-SIGB | HE-STF | HE-LTF | Data |

FIG. 3F (Prior Art)

| L-STF | L-LTF | L-SIG | HE-SIGA | HE-SIGA | HE-SIGB | HE-STF | HE-LTF | Data |

FIG. 3G (Prior Art)

| EHT-SIG1 | EHT-SIG2 | EHT-STF | EHT-LTF |

FIG. 3H

COMMUNICATION METHOD, COMMUNICATION APPARATUS, AND COMMUNICATION DEVICE

CROSS-REFERENCE TO RELATED APPLICATIONS

This application is a continuation of International Patent Application No. PCT/CN2019/094779 filed on Jul. 5, 2019, which claims priority to Chinese Patent Application No. 201810739872.8 filed on Jul. 6, 2018. The disclosures of the aforementioned applications are hereby incorporated by reference in their entireties.

TECHNICAL FIELD

This application relates to the field of communication technologies, and in particular, to a communication method, a communication apparatus, and a communication device.

BACKGROUND

The 802.11 series standards are defined by the Institute of Electrical and Electronics Engineers (IEEE), and widely used for wireless local area networks (WLANs). Mainstream standards in the 802.11 series standards include 802.11a, 802.11n, 802.11ac, 802.11ax, and the like.

A next-generation 802.11 standard also supports working spectra, such as frequency bands of 2.4 gigahertz (GHz), 5 GHz, and 6 GHz, of the 802.11ax standard, in consideration of backward compatibility. Channel division is performed based on the free 6-GHz frequency band that is open recently, and a bandwidth that can be supported may exceed a maximum bandwidth of 160 megahertz (MHz) supported in the 5-GHz frequency band, for example, 240 MHz, 320 MHz, or 400 MHz. In addition to supporting an ultra-high bandwidth, the next-generation 802.11 standard can also support a combination of a plurality of frequency bands (2.4 GHz, 5 GHz, and 6 GHz) and more spatial streams, for example, increasing a quantity of spatial streams to 16, to increase a peak throughput.

In addition, in consideration of compatibility with a conventional WI-FI device in the next-generation 802.11 standard, a frame structure of a physical layer protocol data unit (PPDU) usually starts with a legacy physical layer preamble, and a new physical layer preamble immediately follows the legacy physical layer preamble. The new physical layer preamble may include a new function indication for implementing the next-generation 802.11 standard, for example, a bandwidth indication about an ultra-high bandwidth. A new physical layer preamble in each generation of the 802.11 standards, other than the 802.11a standard, carries information such that a receive end can determine, based on the new physical layer preamble, whether a frame structure of a received PPDU is a frame structure of a PPDU that is generated based on the corresponding generation of the standards. This is referred to as auto-detection. The auto-detection includes the following two meanings. In one aspect, the receive end correctly determines, as a PPDU that is generated based on a current-generation standard, a received PPDU that is generated based on the current-generation standard, but does not determine the received PPDU as a PPDU that is generated based on a non-current-generation standard. In the other aspect, the receive end does not determine, as a PPDU that is generated based on the current-generation standard, a received PPDU that is generated based on the non-current-generation standard. For example, if an 802.11n receive end receives an 802.11n PPDU, the 802.11n receive end correctly determines the received PPDU as an 802.11n PPDU, and if the receive end receives an 802.11a PPDU, the receive end does not determine the received PPDU as an 802.11n PPDU.

Therefore, an auto-detection problem still exists in a design of a physical layer preamble of a PPDU of the next-generation 802.11 standard.

SUMMARY

Embodiments of this application provide a communication method, a communication apparatus, and a communication device, to resolve a current-technology problem of auto-detection that still exists in a design of a physical layer preamble of a PPDU of a next-generation 802.11 standard.

According to a first aspect, an embodiment of this application provides a communication method. The method includes generating a PPDU including a preamble, where the preamble includes a legacy physical layer preamble and a new physical layer preamble, the new physical layer preamble includes a repeated field, and the repeated field is a field that has a preset out-of-order relationship with a preset field of the legacy physical layer preamble in frequency domain, and sending the PPDU.

In the foregoing solution, the preset out-of-order relationship exists between the repeated field and the preset field of the legacy physical layer preamble, and information for automatically detecting that the PPDU is a next-generation PPDU is carried in the PPDU.

In a possible implementation design, a first frequency-domain processing process of generating an orthogonal frequency-division multiplexing (OFDM) symbol of the preset field of the legacy physical layer preamble includes interleaving processing, and a second frequency-domain processing process of generating an OFDM symbol of the repeated field does not include interleaving processing.

In the foregoing solution, the first frequency-domain processing process of generating the OFDM symbol of the preset field of the legacy physical layer preamble includes interleaving processing, and the second frequency-domain processing process of generating the OFDM symbol of the repeated field does not include interleaving processing such that the preset out-of-order relationship exists between the repeated field and the preset field of the legacy physical layer preamble.

In a possible implementation design, the first frequency-domain processing process does not include scrambling processing, and the second frequency-domain processing process includes scrambling processing.

In the foregoing solution, the first frequency-domain processing process of generating the OFDM symbol of the preset field of the legacy physical layer preamble does not include scrambling processing, and the second frequency-domain processing process of generating the OFDM symbol of the repeated field includes scrambling processing such that the preset out-of-order relationship exists between the repeated field and the preset field of the legacy physical layer preamble.

In a possible implementation design, the first frequency-domain processing process does not include out-of-order processing for a data symbol, and the second frequency-domain processing process includes out-of-order processing for a data symbol.

In the foregoing solution, the first frequency-domain processing process of generating the OFDM symbol of the preset field of the legacy physical layer preamble does not include out-of-order processing, and the second frequency-domain processing process of generating the OFDM symbol of the repeated field includes out-of-order processing such that the preset out-of-order relationship exists between the repeated field and the preset field of the legacy physical layer preamble.

In a possible implementation design, out-of-order processing includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

In a possible implementation design, a binary phase-shift keying (BPSK) mode is used for constellation point mapping in the second frequency-domain processing process.

In the foregoing solution, the BPSK mode is used for constellation point mapping in the second frequency-domain processing process. This can avoid the following case. An 802.11n receive end determines, on the basis that a $1^{st}$ OFDM field following a legacy signal (L-SIG) field uses the QBPSK mode for constellation point mapping, that a next-generation PPDU is a high-throughput (HT) PPDU, and consequently the 802.11n receive end incorrectly decodes a $1^{st}$ field of the new physical layer preamble, for example, the 802.11n receive end fails to perform a cyclic redundancy check, and further the 802.11n receive end does not comply with a length field of the L-SIG to enter a silent time period. As a result, this behavior may interfere with the PPDU that is being transmitted.

In a possible implementation design, the legacy physical layer preamble can be decoded by a plurality of receive ends, and the new physical layer preamble can be decoded by a portion of the plurality of receive ends.

In a possible implementation design, a bit input to a channel encoder for the repeated field is the same as a bit input to the channel encoder for the preset field of the legacy physical layer preamble in a frequency-domain processing process.

In a possible implementation design, the preset field of the legacy physical layer preamble is an L-SIG field.

In a possible implementation design, the repeated field is a $1^{st}$ field or a $2^{nd}$ field of the new physical layer preamble.

In a possible implementation design, the repeated field is a $1^{st}$ field of the new physical layer preamble, and any field of the new physical layer preamble other than the $1^{st}$ field uses a rotated BPSK mode for constellation point mapping.

In the foregoing solution, the repeated field is the $1^{st}$ field of the new physical layer preamble, and any field of the new physical layer preamble other than the $1^{st}$ field uses the rotated BPSK mode for constellation point mapping. In this way, based on that the repeated field carries auto-detection information, the auto-detection information is further carried using the rotated BPSK mode. This improves accuracy of determining a PPDU by the receive end.

According to a second aspect, an embodiment of this application provides a communication method. The method includes receiving a PPDU including a preamble, where the preamble includes a legacy physical layer preamble and a new physical layer preamble, determining whether the new physical layer preamble includes a repeated field, where the repeated field is a field that has a preset out-of-order relationship with a preset field of the legacy physical layer preamble in frequency domain, and if the new physical layer preamble includes the repeated field, determining that the PPDU is a target PPDU.

In the foregoing solution, it is determined whether the new physical layer preamble includes the repeated field, where the repeated field is the field that has the preset out-of-order relationship with the preset field of the legacy physical layer preamble in frequency domain. If the new physical layer preamble includes the repeated field, it is determined that the PPDU is the target PPDU, that is, a next-generation PPDU. In this way, a receive end determines, based on the preset out-of-order relationship between the repeated field and the preset field of the legacy physical layer preamble, that the PPDU is the next-generation PPDU.

In a possible implementation design, determining whether the new physical layer preamble includes a repeated field includes determining a similarity between first information and second information, where the first information is obtained by performing a first decoding processing process on the preset field of the legacy physical layer preamble, and the second information is obtained by performing a second decoding processing process on the repeated field, and if the similarity is greater than or equal to a preset threshold, determining that the new physical layer preamble includes the repeated field, or if the similarity is less than a preset threshold, determining that the new physical layer preamble does not include the repeated field.

In a possible implementation design, the first decoding processing process includes de-interleaving processing, and the second decoding processing process does not include de-interleaving processing, or the first decoding processing process does not include de-scrambling processing, and the second decoding processing process includes de-scrambling processing, or the first decoding processing process does not include de-out-of-order processing for a data symbol, and the second decoding processing process includes de-out-of-order processing for a data symbol.

In a possible implementation design, de-out-of-order processing for a data symbol includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

According to a third aspect, an embodiment of this application provides a communication method. The method includes generating a PPDU including a preamble, where the preamble includes a legacy physical layer preamble and a new physical layer preamble, a $1^{st}$ field of the new physical layer preamble is the same as a preset field of the legacy physical layer preamble, and any field of the new physical layer preamble other than the $1^{st}$ field uses a rotated BPSK mode for constellation point mapping, and sending the PPDU.

In the foregoing solution, the $1^{st}$ field of the new physical layer preamble is the same as the preset field of the legacy physical layer preamble, and any field of the new physical layer preamble other than the $1^{st}$ field uses the rotated BPSK mode for constellation point mapping. In this way, a PPDU carries information for automatically detecting that the PPDU is a next-generation PPDU.

In a possible implementation design, a $2^{nd}$ field of the new physical layer preamble uses the rotated BPSK mode for constellation point mapping.

According to a fourth aspect, an embodiment of this application provides a communication method. The method includes receiving a PPDU including a preamble, where the preamble includes a legacy physical layer preamble and a new physical layer preamble, determining whether a $1^{st}$ field of the new physical layer preamble is the same as a preset field of the legacy physical layer preamble, and whether any field of the new physical layer preamble other than the $1^{st}$ field uses a rotated BPSK mode for constellation point mapping, and if the $1^{st}$ field of the new physical layer preamble is the same as the preset field of the legacy physical layer preamble, and any field of the new physical layer preamble other than the $1^{st}$ field uses the rotated BPSK mode for constellation point mapping, determining that the PPDU is a target PPDU.

In the foregoing solution, it is determined whether the $1^{st}$ field of the new physical layer preamble is the same as the preset field of the legacy physical layer preamble, and whether any field of the new physical layer preamble other than the $1^{st}$ field uses the rotated BPSK mode for constellation point mapping. If the $1^{st}$ field of the new physical layer preamble is the same as the preset field of the legacy physical layer preamble, and any field of the new physical layer preamble other than the $1^{st}$ field uses the rotated BPSK mode for constellation point mapping, it is determined that the PPDU is the target PPDU, that is, a next-generation PPDU. In this way, a receive end determines, based on the preset out-of-order relationship between a repeated field and the preset field of the legacy physical layer preamble, that the PPDU is the next-generation PPDU.

In a possible implementation design, determining whether any field of the new physical layer preamble other than the $1^{st}$ field uses a rotated BPSK mode for constellation point mapping includes determining whether a $2^{nd}$ field of the new physical layer preamble uses the rotated BPSK mode for constellation point mapping.

According to a fifth aspect, an embodiment of this application provides a communication method. The method includes generating a PPDU including a new physical layer preamble, where the new physical layer preamble includes a preset field, a check bit of the preset field is located at a preset location of a data subcarrier, and the preset location is used to indicate a frame structure of the PPDU, and sending the PPDU.

In the foregoing solution, the new physical layer preamble includes the preset field, the check bit of the preset field is located at the preset location of the data subcarrier, and the preset location is used to indicate the frame structure of the PPDU. In this way, the PPDU carries information for automatically detecting that the PPDU is a next-generation PPDU.

In a possible implementation design, the preset location is a start location of the data subcarrier.

In a possible implementation design, the preset field is a $1^{st}$ field or a $2^{nd}$ field of the new physical layer preamble.

According to a sixth aspect, an embodiment of this application provides a communication method. The method includes receiving a PPDU including a preamble, where the preamble includes a new physical layer preamble, determining whether a check bit of a preset field of the new physical layer preamble is located at a preset location of a data subcarrier, where the preset location is used to indicate that the PPDU is a target PPDU, and if the check bit of the preset field of the new physical layer preamble is located at the preset location of the data subcarrier, determining that the PPDU is the target PPDU.

In the foregoing solution, it is determined whether the check bit of the preset field of the new physical layer preamble is located at the preset location of the data subcarrier, where the preset location is used to indicate that the PPDU is the target PPDU. If the check bit of the preset field of the new physical layer preamble is located at the preset location of the data subcarrier, it is determined that the PPDU is the target PPDU, that is, next-generation PPDU. In this way, a receive end determines, based on a preset out-of-order relationship between a repeated field and a preset field of a legacy physical layer preamble, that the PPDU is the next-generation PPDU.

In a possible implementation design, the preset location is a start location of the data subcarrier.

In a possible implementation design, the preset field is a $1^{st}$ field or a $2^{nd}$ field of the new physical layer preamble.

According to a seventh aspect, an embodiment of this application provides a communication apparatus, used for a transmit end. The communication apparatus includes a generation unit configured to generate a PPDU including a preamble, where the preamble includes a legacy physical layer preamble and a new physical layer preamble, the new physical layer preamble includes a repeated field, and the repeated field is a field that has a preset out-of-order relationship with a preset field of the legacy physical layer preamble in frequency domain, and a sending unit configured to send the PPDU.

In a possible implementation design, a first frequency-domain processing process of generating an OFDM symbol of the preset field of the legacy physical layer preamble includes interleaving processing, and a second frequency-domain processing process of generating an OFDM symbol of the repeated field does not include interleaving processing, or the first frequency-domain processing process does not include scrambling processing, and the second frequency-domain processing process includes scrambling processing, or the first frequency-domain processing process does not include out-of-order processing for a data symbol, and the second frequency-domain processing process includes out-of-order processing for a data symbol.

In a possible implementation design, out-of-order processing includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

In a possible implementation design, a BPSK mode is used for constellation point mapping in the second frequency-domain processing process.

In a possible implementation design, the legacy physical layer preamble can be decoded by a plurality of receive ends, and the new physical layer preamble can be decoded by a portion of the plurality of receive ends.

In a possible implementation design, a bit input to a channel encoder for the repeated field is the same as a bit input to the channel encoder for the preset field of the legacy physical layer preamble in a frequency-domain processing process.

In a possible implementation design, the preset field of the legacy physical layer preamble is an L-SIG field.

In a possible implementation design, the repeated field is a $1^{st}$ field or a $2^{nd}$ field of the new physical layer preamble.

In a possible implementation design, the repeated field is a $1^{st}$ field of the new physical layer preamble, and any field of the new physical layer preamble other than the $1^{st}$ field uses a rotated BPSK mode for constellation point mapping.

For beneficial effects of the communication apparatus provided in the seventh aspect and the possible implementations of the seventh aspect, refer to the beneficial effects of the first aspect and the possible implementations of the first aspect. Details are not described herein again.

According to an eighth aspect, an embodiment of this application provides a communication apparatus, used for a receive end. The communication apparatus includes a receiving unit configured to receive a PPDU including a preamble, where the preamble includes a legacy physical layer preamble and a new physical layer preamble, and a determining unit configured to determine whether the new physical layer preamble includes a repeated field, where the repeated field is a field that has a preset out-of-order relationship with a preset field of the legacy physical layer preamble in frequency domain, and if the new physical layer preamble includes the repeated field, determine that the PPDU is a target PPDU.

In a possible implementation design, that the determining unit is configured to determine a similarity between first information and second information, where the first information is obtained by performing a first decoding processing process on the preset field of the legacy physical layer preamble, and the second information is obtained by performing a second decoding processing process on the repeated field, and if the similarity is greater than or equal to a preset threshold, determine that the new physical layer preamble includes the repeated field, or if the similarity is less than a preset threshold, determine that the new physical layer preamble does not include the repeated field.

In a possible implementation design, the first decoding processing process includes de-interleaving processing, and the second decoding processing process does not include de-interleaving processing, or the first decoding processing process does not include de-scrambling processing, and the second decoding processing process includes de-scrambling processing, or the first decoding processing process does not include de-out-of-order processing for a data symbol, and the second decoding processing process includes de-out-of-order processing for a data symbol.

In a possible implementation design, de-out-of-order processing for a data symbol includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

For beneficial effects of the communication apparatus provided in the eighth aspect and the possible implementations of the eighth aspect, refer to the beneficial effects of the second aspect and the possible implementations of the second aspect. Details are not described herein again.

According to a ninth aspect, an embodiment of this application provides a communication apparatus, used for a transmit end. The communication apparatus includes a generation unit configured to generate a PPDU including a preamble, where the preamble includes a legacy physical layer preamble and a new physical layer preamble, a $1^{st}$ field of the new physical layer preamble is the same as a preset field of the legacy physical layer preamble, and any field of the new physical layer preamble other than the $1^{st}$ field uses a rotated BPSK mode for constellation point mapping, and a sending unit configured to send the PPDU.

In a possible implementation design, a $2^{nd}$ field of the new physical layer preamble uses the rotated BPSK mode for constellation point mapping.

For beneficial effects of the communication apparatus provided in the ninth aspect and the possible implementations of the ninth aspect, refer to the beneficial effects of the third aspect and the possible implementations of the third aspect. Details are not described herein again.

According to a tenth aspect, an embodiment of this application provides a communication apparatus, used for a receive end. The communication apparatus includes a receiving unit configured to receive a PPDU including a preamble, where the preamble includes a legacy physical layer preamble and a new physical layer preamble, and a determining unit configured to determine whether a $1^{st}$ field of the new physical layer preamble is the same as a preset field of the legacy physical layer preamble, and whether any field of the new physical layer preamble other than the $1^{st}$ field uses a rotated BPSK mode for constellation point mapping, and if the $1^{st}$ field of the new physical layer preamble is the same as the preset field of the legacy physical layer preamble, and any field of the new physical layer preamble other than the $1^{st}$ field uses a rotated BPSK mode for constellation point mapping, determine that the PPDU is a target PPDU.

In a possible implementation design, the determining unit is configured to determine whether a $2^{nd}$ field of the new physical layer preamble uses the rotated BPSK mode for constellation point mapping.

For beneficial effects of the communication apparatus provided in the tenth aspect and the possible implementations of the tenth aspect, refer to the beneficial effects of the fourth aspect and the possible implementations of the fourth aspect. Details are not described herein again.

According to an eleventh aspect, an embodiment of this application provides a communication apparatus, used for a transmit end. The communication apparatus includes a generation unit configured to generate a PPDU including a new physical layer preamble, where the new physical layer preamble includes a preset field, a check bit of the preset field is located at a preset location of a data subcarrier, and the preset location is used to indicate a frame structure of the PPDU, and a sending unit configured to send the PPDU.

In a possible implementation design, the preset location is a start location of the data subcarrier.

In a possible implementation design, the preset field is a $1^{st}$ field or a $2^{nd}$ field of the new physical layer preamble.

For beneficial effects of the communication apparatus provided in the eleventh aspect and the possible implementations of the eleventh aspect, refer to the beneficial effects of the fifth aspect and the possible implementations of the fifth aspect. Details are not described herein again.

According to a twelfth aspect, an embodiment of this application provides a communication apparatus, used for a receive end. The communication apparatus includes a receiving unit configured to receive a PPDU including a preamble, where the preamble includes a new physical layer preamble, and a determining unit configured to determine whether a check bit of a preset field of the new physical layer preamble is located at a preset location of a data subcarrier, where the preset location is used to indicate that the PPDU is a target PPDU, and if the check bit of the preset field of the new physical layer preamble is located at the preset location of the data subcarrier, determine that the PPDU is the target PPDU.

In a possible implementation design, the preset location is a start location of the data subcarrier.

In a possible implementation design, the preset field is a $1^{st}$ field or a $2^{nd}$ field of the new physical layer preamble.

For beneficial effects of the communication apparatus provided in the twelfth aspect and the possible implementations of the twelfth aspect, refer to the beneficial effects of the sixth aspect and the possible implementations of the sixth aspect. Details are not described herein again.

According to a thirteenth aspect, an embodiment of this application provides a communication device, including a processor, a memory, and a communication interface, where the processor controls transmit and receive actions of the communication interface, the memory stores a program, and the processor invokes the program stored in the memory, to perform the method according to any one of the first aspect, the third aspect, or the fifth aspect.

According to a fourteenth aspect, an embodiment of this application provides a communication device, including a processor, a memory, and a communication interface, where the processor controls transmit and receive actions of the communications interface, the memory stores a program, and the processor invokes the program stored in the memory, to perform the method according to any one of the second aspect, the fourth aspect, or the sixth aspect.

According to a fifteenth aspect, an embodiment of this application provides a storage medium. The storage medium stores a computer program, and when the computer program is executed by a processor, the method according to any one of the first aspect, the third aspect, or the fifth aspect is implemented.

According to a sixteenth aspect, an embodiment of this application further provides a program product. The program product includes a computer program (that is, an executable instruction), and the computer program is stored in a readable storage medium. At least one processor of a transmit end may read the computer program from the readable storage medium, and the at least one processor executes the computer program such that the transmit end performs the method provided in the first aspect, the third aspect, or the fifth aspect.

According to a seventeenth aspect, an embodiment of this application provides a storage medium. The storage medium stores a computer program, and when the computer program is executed by a processor, the method according to any one of the second aspect, the fourth aspect, or the sixth aspect is implemented.

According to an eighteenth aspect, an embodiment of this application further provides a program product. The program product includes a computer program (that is, an executable instruction), and the computer program is stored in a readable storage medium. At least one processor of a receive end may read the computer program from the readable storage medium, and the at least one processor executes the computer program such that the receive end performs the method provided in the second aspect, the fourth aspect, or the sixth aspect.

BRIEF DESCRIPTION OF DRAWINGS

FIG. 3E is a schematic diagram of a frame structure of a high-efficiency (HE) PPDU according to an embodiment of this application;

FIG. 3F is a schematic diagram of a frame structure of an HE PPDU including a signature field according to an embodiment of this application;

FIG. 3G is a schematic diagram of a frame structure of an HE PPDU including a repeated HE signal A (HE-SIG A) field according to an embodiment of this application;

FIG. 3H is a schematic diagram of a new physical layer preamble of an extremely HT (EHT) PPDU according to an embodiment of this application;

DESCRIPTION OF EMBODIMENTS

Figure 1:
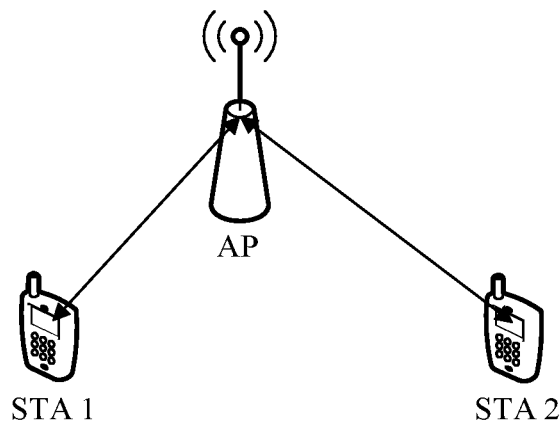
FIG. 1 is a schematic diagram of an application architecture according to an embodiment of this application.

FIG. 1 is a schematic diagram of an application architecture according to an embodiment of this application. As shown in FIG. 1, an example in which there is one AP and there are two base STAs is used. The application architecture in this embodiment may include an AP, a STA 1, and a STA 2. The AP is communicatively connected to the STA 1 and the STA 2, the STA 1 is communicatively connected to the STA 2, and the AP may be further communicatively connected to another AP. It should be noted that a communication method provided in the embodiments of this application may be used for communication between APs, communication between STAs, and communication between an AP and a STA. The AP may be used as a receive end or a transmit end. The STA may be used as a receive end or a transmit end.

The AP includes but is not limited to a communication server, a router, a switch, a bridge, or the like. The STA includes but is not limited to a computer, a mobile phone, or the like.

Figure 2:
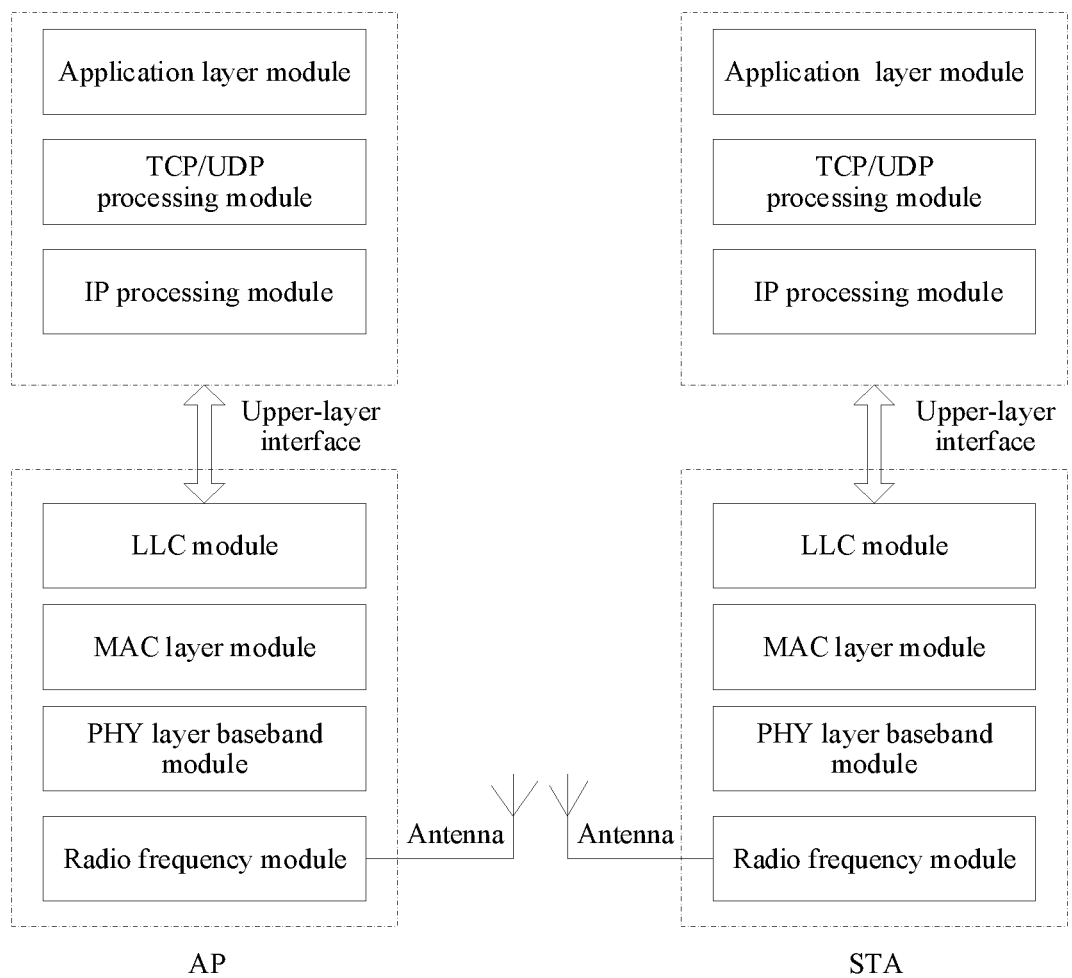
FIG. 2 is a schematic diagram of internal structures of an access point (AP) and a station (STA) according to an embodiment of this application.

As shown in FIG. 2, an internal structure of each of the AP and the STA may include, for example, an antenna, a radio frequency module, a physical (PHY) layer baseband module, a media access control (MAC) layer module, a logical link control (LLC) module, an Internet Protocol (IP) processing module, a Transmission Control Protocol (TCP)/

User Datagram Protocol (UDP) processing module, and an application layer module. The IP module and the LLC module may communicate with each other through an upper-layer interface. There may be one or more antennas, and the STA and the AP may have a same quantity of antennas or different quantities of antennas.

It should be noted that the AP and the STA may support the 802.11 standard. The 802.11 standard mainly relates to a PHY layer and a MAC layer. This application mainly relates to a PPDU.

Figure 3A:
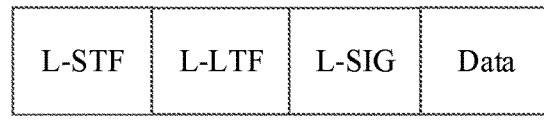
FIG. 3A is a schematic diagram of a frame structure of an 802.11a PPDU according to an embodiment of this application.

Further, as shown in FIG. 3A, a frame structure of a PPDU (which may be denoted as an 802.11a PPDU) is defined in the 802.11a standard, and includes the following fields: data and a legacy physical layer preamble. The legacy physical layer preamble includes a legacy-short training field (L-STF), a legacy-long training field (L-LTF), and an L-SIG field.

In addition, the 802.11a standard is a first-generation mainstream WI-FI protocol, and the PPDU frame structure of the 802.11a PPDU includes only the legacy physical layer preamble and the data field and does not include other preamble fields. Therefore, a PPDU complying with the 802.11a standard does not carry information for automatically detecting that the PPDU is an 802.11a PPDU.

Figure 3B:
FIG. 3B is a schematic diagram of a frame structure of an HT PPDU according to an embodiment of this application.

Further, as shown in FIG. 3B, based on FIG. 3A, a frame structure of a mixed format (MF) PPDU (which may be denoted as an HT PPDU or an 802.11n PPDU) is defined in the 802.11n standard, and includes the following fields: data, a legacy physical layer preamble, and a new physical layer preamble. The new physical layer preamble includes: an HT signal (HT-SIG) field, an HT short training field (HT-STF), and an HT long training field (HT-LTF). The HT-SIG includes two OFDM symbols, and each OFDM symbol has duration of 4 microseconds (μs).

To differentiate between an HT PPDU and an 802.11a PPDU, a PPDU complying with the 802.11n standard needs to carry information for automatically detecting that the PPDU is an HT PPDU. Further, both the two OFDM symbols included in the 802.11n HT-SIG need to use a rotated BPSK (or quadrature BPSK (QBPSK)) mode for constellation point mapping. The QBPSK is equivalent to rotating a phase of BPSK by 90 degrees such that information carried on an I axis is shifted to a Q axis. An 802.11n receive end compares Q-axis energy with I-axis energy. When an energy difference is greater than a threshold, the 802.11n receive end determines that a received PPDU is an HT PPDU, or when an energy difference is less than or equal to a threshold, the 802.11n receive end determines that the received PPDU is an 802.11a PPDU.

Figure 3C:
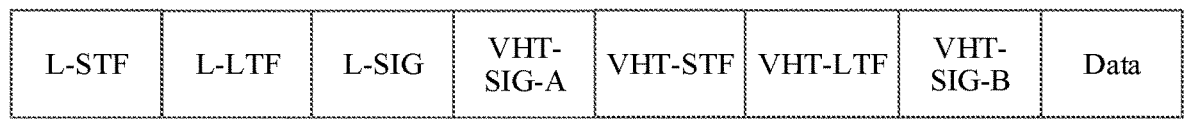
FIG. 3C is a schematic diagram of a frame structure of a very-HT (VHT) PPDU according to an embodiment of this application.

As shown in FIG. 3C, based on FIG. 3A, a frame structure of a PPDU (which may be denoted as a VHT PPDU or an 802.11ac PPDU) is defined in the 802.11ac standard, and includes the following fields: data, a legacy physical layer preamble, and a new physical layer preamble. The new physical layer preamble includes: a VHT signal A field (VHT-SIG A), a VHT short training field (VHT-STF), a VHT long training field (VHT-LTF), and a VHT signal B field (VHT-SIG B). The VHT-SIG A (which may also be denoted as VHTSIGA) includes two OFDM symbols, and each symbol has duration of 4 μs.

To differentiate between a VHT PPDU, an HT PPDU, and an 802.11a PPDU, a PPDU complying with the 802.11ac standard needs to carry information for automatically detecting that the PPDU is a VHT PPDU. Further, a $1^{st}$ OFDM of the VHT-SIG A uses a BPSK mode for constellation point mapping, and a $2^{nd}$ OFDM of the VHT-SIG A uses a QBPSK mode for constellation point mapping. A receive end determines an energy difference between Q-axis energy and an I-axis energy of each of the two OFDM symbols of the VHT-SIG-A. When an energy difference obtained by subtracting the I-axis energy from the Q-axis energy of the $1^{st}$ OFDM symbol is less than a threshold, and an energy difference obtained by subtracting the I-axis energy from the Q-axis energy of the $2^{nd}$ OFDM symbol is greater than the threshold, the receive end determines that a received PPDU is a VHT PPDU.

Figure 3D:
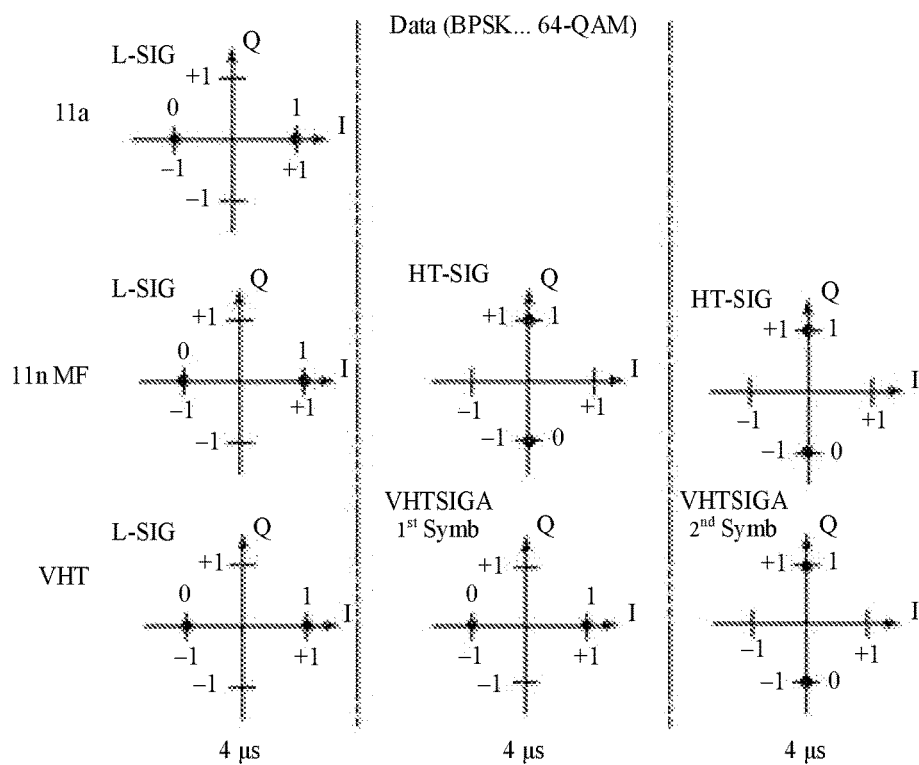
FIG. 3D is a schematic diagram of carrying auto-detection information by an HT PPDU and a VHT PPDU according to an embodiment of this application.

A manner of carrying auto-detection information by the new physical layer preamble of the 802.11n HT PPDU and a manner of carrying auto-detection information by the new physical layer preamble of the 802.11ac VHT PPDU may be further shown in FIG. 3D.

Still further, as shown in FIG. 3E, based on FIG. 3A, a frame structure of a PPDU (which may be denoted as an HE PPDU or an 802.11ax PPDU) is defined in the 802.11ax standard, and includes the following fields: data, a legacy physical layer preamble, and a new physical layer preamble. The new physical layer preamble includes: an HE signal A field (HE-SIG A), an HE signal B field (HE-SIG B), an HE short training field (HE-STF), and an HE long training field (HE-LTF).

To differentiate between an HE PPDU, a VHT PPDU, an HT PPDU, and an 802.11a PPDU, a PPDU complying with the 802.11ax standard needs to carry information for automatically detecting that the PPDU is an HE PPDU. Further, a repeated legacy signal (RL-SIG) field is added between the L-SIG and the HE-SIG A. Data carried on each frequency-domain subcarrier of the RL-SIG is the same as data carried on each frequency-domain subcarrier of the L-SIG. A receive end determines, by comparing whether the L-SIG is the same as the RL-SIG, whether a received PPDU is an HE PPDU. To improve accuracy of a determining result, the receive end may further determine, by determining whether a value of a length field in the L-SIG field can be exactly divided by 3, whether the received PPDU is an HE PPDU. Further, if the value of the length field cannot be exactly divided by 3, the receive end determines that the received PPDU is an HE PPDU, or if the value of the length field can be exactly divided by 3, the receive end determines that the received PPDU is a PPDU defined in a standard earlier than 802.11ax. It should be noted that the value of the length field of the L-SIG field in the PPDU defined in the standard earlier than 802.11ax can be exactly divided by 3, but the value of the length field of the L-SIG field in the 802.11ax PPDU cannot be exactly divided by 3.

In addition, in discussion of the PPDU frame structure of the HE PPDU, the following two types of information for automatically detecting that a PPDU is an HE PPDU are further provided.

1. A signature field is added after the L-SIG, and a specific PPDU frame structure may be shown in FIG. 3F. The signature field includes a signature sequence, and the signature sequence has a length of 1 bit to 26 bits. A longer signature sequence indicates better performance but higher overheads. The receive end decodes the signature field, and compares a similarity between a locally stored signature sequence and a received signature sequence. If the similarity is greater than a threshold, the receive end determines that the received PPDU is an HE PPDU, of if the similarity is less than or equal to a threshold, the receive end determines that the received PPDU is not an HE PPDU. However, the signature sequence causes extra overheads to the preamble, and has a disadvantage of carrying no other functions but only an auto-detection function.

2. A repeated HE-SIG A is used, and a specific PPDU structure may be shown in FIG. 3G. The receive end compares a similarity between two OFDM symbols following a received L-SIG. If the similarity is greater than a threshold, the receive end determines that the received PPDU is an HE PPDU, of if the similarity is less than or equal to a threshold, the receive end determines that the received PPDU is not an HE PPDU. However, the comparison between the two OFDM symbols following the L-SIG results in a delay in auto-detection.

Currently, a next-generation 802.11 standard is proposed based on the foregoing 802.11 standards. A frame structure of a PPDU (which may be denoted as a next-generation PPDU, for example, an EHT PPDU) is defined in the next-generation 802.11 standard, and includes the following fields: data, a legacy physical layer preamble, and a new physical layer preamble. When the next-generation PPDU is an EHT PPDU, as shown in FIG. 3H, the new physical layer preamble may include, for example, an EHT signal 1 field (EHT-SIG1), an EHT signal 2 field (EHT-SIG2), an EHT short training field (EHT-STF), and an EHT long training field (EHT-LTF). The EHT-SIG1 may be used to carry common signal such as a bandwidth. The EHT-SIG2 may be used to carry signal such as a resource allocation indication and station information. The EHT-STF may be used by the receive end for automatic gain control (AGC). The EHT-LTF may be used by the receive end for channel estimation. Optionally, the new physical layer preamble may further include an EHT signal 3 field (EHT-SIG3). For example, the EHT-SIG3 follows the EHT-LTF. A subcarrier spacing corresponding to an OFDM symbol in a data field of each of the EHT-STF, the EHT-LTF, and the EHT-SIG3 may be less than a subcarrier spacing corresponding to an OFDM symbol of the legacy physical layer preamble.

To differentiate between a next-generation PPDU and existing PPDUs such as an HE PPDU, a VHT PPDU, an HT PPDU, and an 802.11a PPDU, and to avoid using the foregoing two types of information, how a new physical layer preamble of a PPDU carries information for automatically detecting that the PPDU is a next-generation PPDU in the next-generation 802.11 standard is mainly discussed in this application.

The technical solutions of this application are described in detail using the following specific embodiments. The following several specific embodiments may be combined with each other, and same or similar concepts or processes may not be described repeatedly in some embodiments.

Figure 4:
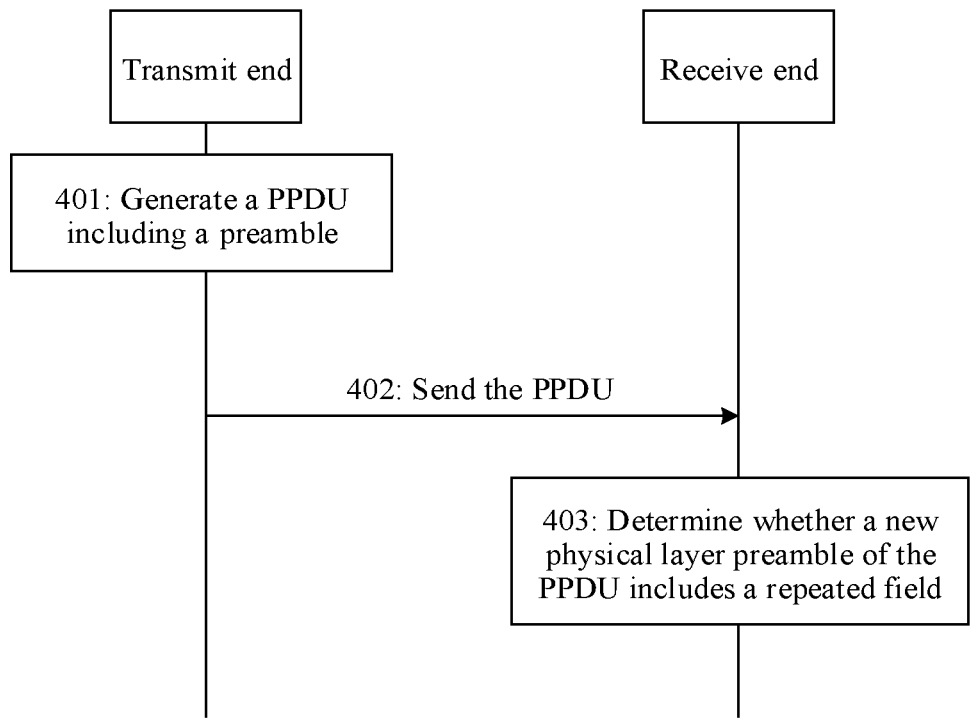
FIG. 4 is a flowchart of a communication method according to an embodiment of this application.

FIG. 4 is a flowchart of a communication method according to an embodiment of this application. As shown in FIG. 4, the method in this embodiment may include the following steps.

Step 401: A transmit end generates a PPDU including a preamble.

In this step, the preamble includes a legacy physical layer preamble and a new physical layer preamble. The legacy physical layer preamble includes the L-STF, the L-LTF, and the L-SIG in FIG. 3A to FIG. 3F, and can be decoded by a receive end that supports the 802.11a standard. The new physical layer preamble is different from the new physical layer preamble in FIG. 3B to FIG. 3F, and can be decoded by a receive end that supports a next-generation 802.11 standard. In consideration of compatibility, the receive end that supports the next-generation 802.11 standard can also support the 802.11a standard. Therefore, the legacy physical layer preamble can be decoded by a plurality of receive ends, and the new physical layer preamble can be decoded by a portion of the plurality of receive ends. Further, the legacy physical layer preamble can be successfully received by an existing WI-FI device and a next-generation WI-FI device. However, the new physical layer preamble can be successfully received by the next-generation WI-FI device, but cannot be received by the existing WI-FI device.

The new physical layer preamble includes a repeated field. The repeated field is a field that has a preset out-of-order relationship with a preset field of the legacy physical layer preamble in frequency domain. To be specific, in frequency domain, after transform of the preset out-of-order relationship is performed on the repeated field, the repeated field may be the same as the preset field of the legacy physical layer preamble. After inverse transform of the transform is performed on the preset field of the legacy physical layer preamble, the preset field may be the same as the repeated field.

It should be noted that, when the preset field of the legacy physical layer preamble includes a plurality of OFDM symbols, there is the preset out-of-order relationship between the repeated field and the preset field of the legacy physical layer preamble in frequency domain. Further, there may be the preset out-of-order relationship between one OFDM symbol of the repeated field and one OFDM symbol of the preset field of the legacy physical layer preamble in frequency domain, or there may be the preset out-of-order relationship between each of a plurality of OFDM symbols of the repeated field and each a plurality of OFDM symbols of the preset field of the legacy physical layer preamble in frequency domain.

Optionally, the preset field of the legacy physical layer preamble may be any one of the L-STF, the L-LTF, or the L-SIG. For ease of implementation, the preset field of the legacy physical layer preamble may be the L-SIG.

It should be noted that, in this embodiment, the repeated field in the new physical layer preamble is used to carry information for automatically detecting that the PPDU is a next-generation PPDU. In addition to the repeated field, the new physical layer preamble may further include a field used to carry a new function indication provided in the next-generation 802.11 standard. The new physical layer preamble may further include, for example but not limited to, the field shown in FIG. 3H.

For example, the next-generation PPDU is an EHT PPDU, and the preset field of the legacy physical layer preamble is an L-SIG. A frame structure of the EHT PPDU may be shown in FIG. 5A. A CL-SIG is a repeated field, and there is a preset out-of-order relationship between the CL-SIG and the L-SIG in frequency domain.

Interleaving processing, out-of-order processing, scrambling processing, and the like can be used to implement frequency-domain out of order processing. Therefore, one or more of interleaving processing, out-of-order processing, scrambling processing, and the like may be performed to enable the repeated field to be the field that has the preset out-of-order relationship with the preset field of the legacy physical layer preamble in frequency domain.

Optionally, assuming that a frequency-domain processing process of generating an OFDM symbol of the preset field of the legacy physical layer preamble is a first frequency-domain processing process, and that a frequency-domain processing process of generating an OFDM symbol of the repeated field is a second processing process, the repeated field that has the preset out-of-order relationship with the preset field of the legacy physical layer preamble in frequency domain may be generated in any one of the following three manners.

Manner 1: The first frequency-domain processing process includes interleaving processing, and the second frequency-domain processing process does not include interleaving processing.

Figure 5A:
FIG. 5A is a schematic diagram 1 of a frame structure of an EHT PPDU according to an embodiment of this application.
Figure 5B:
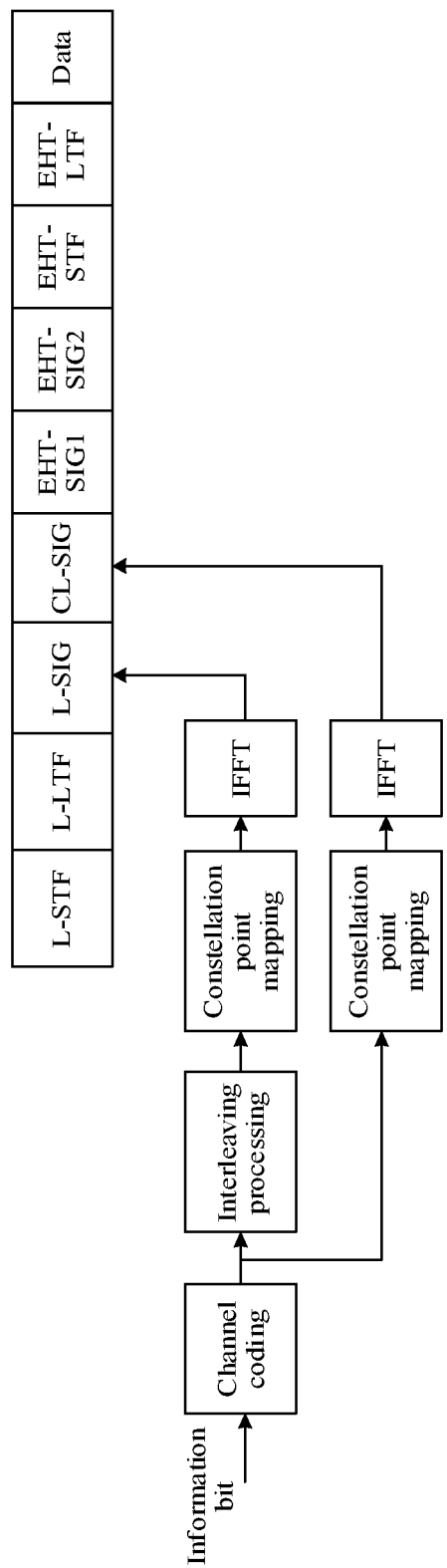
FIG. 5B is a schematic diagram 1 of obtaining a CL-SIG shown in FIG. 5A according to an embodiment of this application.

Further, for example, the next-generation PPDU is the EHT PPDU, the preset field of the legacy physical layer preamble is the L-SIG, and the frame structure of the EHT PPDU is shown in FIG. 5A. As shown in FIG. 5B, after channel coding, interleaving processing, constellation point mapping, and inverse fast Fourier transform (IFFT) are sequentially performed on a frequency-domain information bit carried in the L-SIG field, the L-SIG is generated. After channel coding, constellation point mapping processing, and IFFT are sequentially performed on the information bit, the CL-SIG is generated. That is, the interleaving processing step performed in the process of generating the L-SIG may not be performed.

Optionally, an only difference between the first frequency-domain processing process and the second frequency-domain processing process may lie in that, the first frequency-domain processing process includes interleaving processing, but the second frequency-domain processing process does not include interleaving processing. Except that, other processing is the same. For example, a constellation point mapping mode in the first processing process is the same as a constellation point mapping mode in the second frequency-domain processing process. For another example, coding and IFFT performed in the second frequency-domain processing process of generating the CL-SIG are the same as coding and IFFT performed in the first frequency-domain processing process of generating the L-SIG. Cyclic shift delay (CSD) processing, cyclic prefix (CP) processing, and the like may be further performed after IFFT.

Alternatively, optionally, in addition to the difference that the first frequency-domain processing process includes interleaving processing and the second frequency-domain processing process does not include interleaving processing, there may be another difference between the processing process of generating the CL-SIG and the processing process of generating the L-SIG. For example, a constellation point mapping mode in the first processing process is different from a constellation point mapping mode in the second frequency-domain processing process.

Manner 2: The first frequency-domain processing process does not include scrambling processing, and the second frequency-domain processing process includes scrambling processing.

Figure 5C:
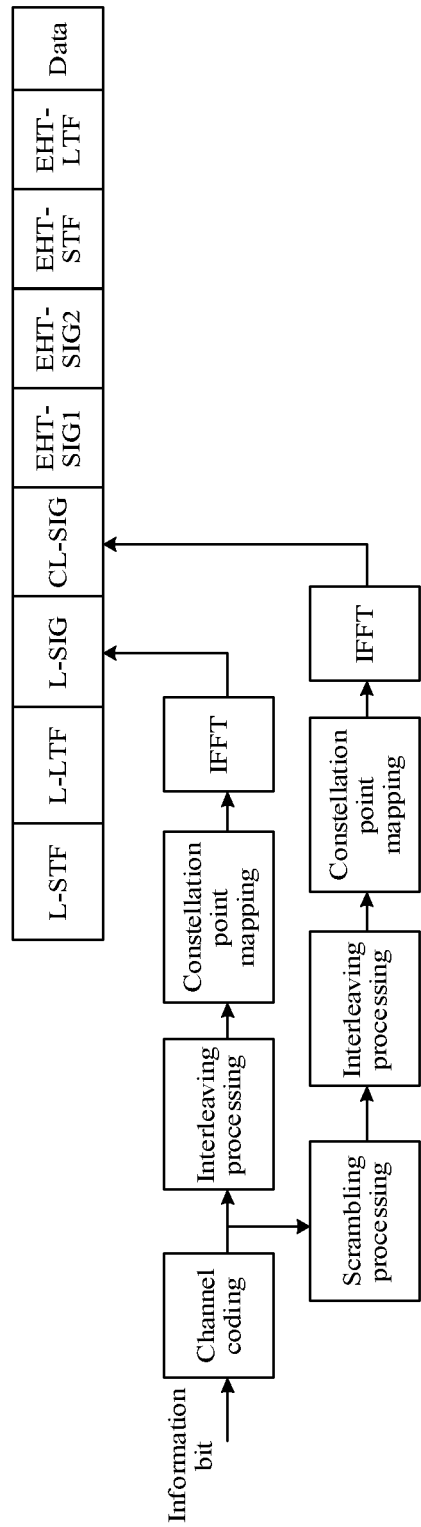
FIG. 5C is a schematic diagram 2 of obtaining a CL-SIG shown in FIG. 5A according to an embodiment of this application.

Further, for example, the next-generation PPDU is the EHT PPDU, the preset field of the legacy physical layer preamble is the L-SIG, and the frame structure of the EHT PPDU is shown in FIG. 5A. As shown in FIG. 5C, after channel coding, interleaving processing, constellation point mapping, and IFFT are sequentially performed on a frequency-domain information bit carried in the L-SIG field, the L-SIG is generated. After channel coding, scrambling processing, interleaving processing, constellation point mapping processing, and IFFT are sequentially performed on the information bit, the CL-SIG is generated. It should be noted that, alternatively, scrambling processing may be performed before channel coding, or may be performed after interleaving processing and before constellation point mapping. A scrambler relating to scrambling processing may be a scrambler of IEEE 802.11a.

Optionally, an only difference between the first frequency-domain processing process and the second frequency-domain processing process may lie in that, the first frequency-domain processing process does not include scrambling processing, but the second frequency-domain processing process includes scrambling processing. Except that, other processing is the same.

Alternatively, optionally, in addition to the difference that the first frequency-domain processing process does not include scrambling processing and the second frequency-domain processing process includes scrambling processing, there may be another difference between the processing process of generating the CL-SIG and the processing process of generating the L-SIG. For example, a constellation point mapping mode in the first processing process is different from a constellation point mapping mode in the second frequency-domain processing process.

It should be noted that, in FIG. 5C, that scrambling processing is performed before IFFT and after constellation point mapping is used as an example. Scrambling processing may be performed before IFFT. Optionally, scrambling processing may be performed before channel coding or after constellation point mapping.

Manner 3: The first frequency-domain processing process does not include out-of-order processing for a data symbol, and the second frequency-domain processing process includes out-of-order processing for a data symbol.

Figure 5D:
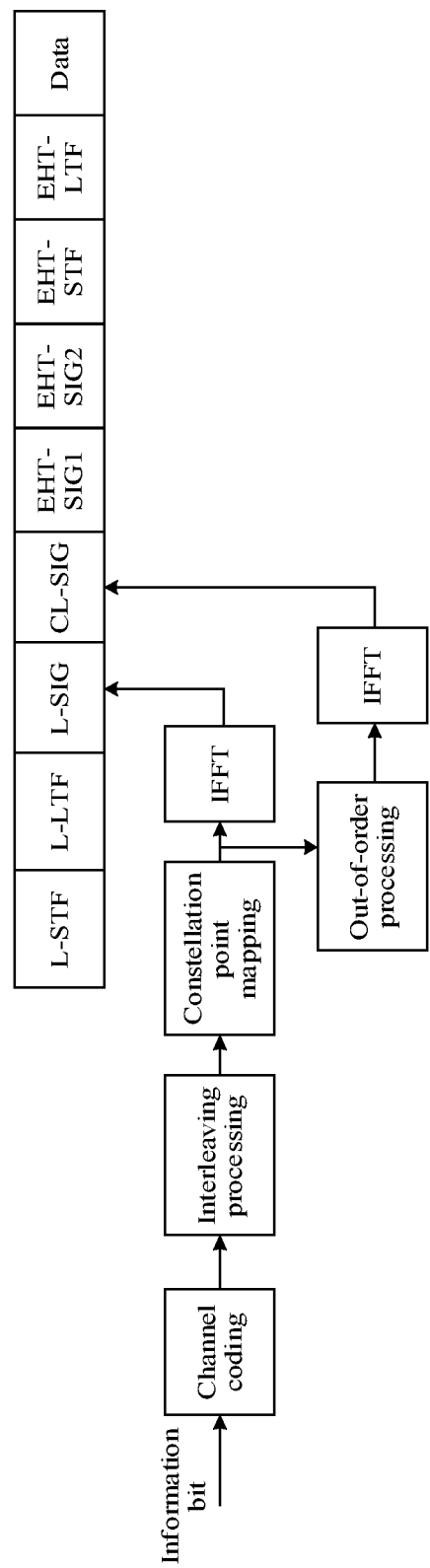
FIG. 5D is a schematic diagram 3 of obtaining a CL-SIG shown in FIG. 5A according to an embodiment of this application.

Further, for example, the next-generation PPDU is the EHT PPDU, the preset field of the legacy physical layer preamble is the L-SIG, and the frame structure of the EHT PPDU is shown in FIG. 5A. As shown in FIG. 5D, after channel coding, interleaving processing, constellation point mapping, and IFFT are sequentially performed on a frequency-domain information bit carried in the L-SIG field, the L-SIG is generated. After channel coding, interleaving processing, constellation point mapping processing, out-of-order processing, and IFFT are sequentially performed on the information bit, the CL-SIG is generated.

Optionally, an only difference between the first frequency-domain processing process and the second frequency-domain processing process may lie in that, the first frequency-domain processing process does not include out-of-order processing for a data symbol, but the second frequency-domain processing process includes out-of-order processing for a data symbol. Except that, other processing is the same. Alternatively, optionally, an only difference between the processing process of generating the CL-SIG and the processing process of generating the L-SIG lies in that, the first frequency-domain processing process does not include out-of-order processing for a data symbol, and the second frequency-domain processing process includes out-of-order processing for a data symbol.

It should be noted that a data symbol is generated after constellation point mapping is performed on an information bit.

Optionally, out-of-order processing includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

Optionally, the data symbols carried on the data subcarriers may be cyclically shifted by n bits, where n may be an integer greater than 0 and less than a quantity of data subcarriers. For example, the quantity of data subcarriers is 48, where n=1, . . . , 47. Further, it is assumed that, in the first frequency-domain processing process, after constellation point mapping is performed, data symbols carried on the 48 data subcarriers ranked from a low frequency to a high frequency are respectively D1, D2, . . . , and D48, and n=1.

After cyclic shift is performed on the data symbols carried on the data subcarriers, the data symbols carried on the 48 data subcarriers ranked from the low frequency to the high frequency are respectively D2, D3, . . . , D48, and D1. It should be noted that cyclic shift may be performed on the data symbols after constellation point mapping, or cyclic shift may be performed, before constellation point mapping, on coding bits obtained through channel coding.

Optionally, assuming that a quantity of data subcarriers is m, and numbers (which may also be referred to as sequence numbers) of the m data subcarriers ranked from a low frequency to a high frequency are respectively 1, . . . , and m, an odd-numbered data subcarrier and an even-numbered data subcarrier may be grouped into one group to obtain m/2 groups, and a data symbol carried on the odd-numbered data subcarrier and a data symbol carried on the even-numbered data subcarrier in one group are interchanged. For example, it is assumed that, in the first frequency-domain processing process, after constellation point mapping is performed, data symbols carried on 48 data subcarriers ranked from the low frequency to the high frequency are respectively D1, D2, . . . , and D48. After a data symbol carried on an odd-numbered data subcarrier and a data symbol carried on an even-numbered data carrier are interchanged, the data symbols carried on the 48 data subcarriers ranked from the low frequency to the high frequency are respectively D2, D1, D4, D3, . . . , D48, and D47. Alternatively, when there is a one-to-one correspondence between coding bits obtained through channel coding and data symbols, each coding bit may correspond to one data subcarrier. Alternatively, before constellation point mapping, coding bits that are obtained through channel coding and that correspond to odd-numbered and even-numbered data subcarriers may be interchanged.

Optionally, a set including all data subcarriers may be divided, based on frequencies of the data subcarriers, into a high-frequency data subcarrier subset and a low-frequency data subcarrier subset corresponding to the high-frequency subcarrier subset. A frequency of a data subcarrier in the high-frequency subcarrier subset is higher than a frequency of a data subcarrier in the low-frequency subcarrier subset corresponding to the high-frequency subcarrier subset. A data symbol carried on a data subcarrier in the high-frequency data subcarrier subset and a data symbol carried on a data subcarrier in the low-frequency subcarrier subset corresponding to the high-frequency subcarrier subset are interchanged. It should be noted that there may be one or more high-frequency subcarrier subsets, and one low-frequency subcarrier subset corresponds to one high-frequency subcarrier subset. For example, there are 48 data subcarriers, there is one high-frequency subcarrier subset, and in the first frequency-domain processing process, data symbols carried on the 48 data subcarriers ranked from a low frequency to a high frequency after constellation point mapping are respectively D1, D2, . . . , and D48. After data symbols carried on data subcarriers in the high-frequency subcarrier subset and data symbols carried on data subcarriers in the low-frequency data subcarrier subset are interchanged, the data symbols carried on the 48 data subcarriers ranked from the low frequency to the high frequency are respectively D25, D26, . . . , D48, D1, D2, . . . , and D24. Alternatively, when there is a one-to-one correspondence between coding bits obtained through channel coding and data symbols, each coding bit may correspond to one data subcarrier. Alternatively, before constellation point mapping, coding bits that are obtained through channel coding and that correspond to high-frequency and low-frequency data subcarriers may be interchanged.

It should be noted that, in addition to the foregoing three specific out-of-order processing manners that are described in detail, another out-of-order processing manner may be used. For example, every 12 data subcarriers are grouped into one group to obtain four groups: a group 1, a group 2, a group 3, and a group 4. Data symbols carried on data subcarriers in the group 1 and data symbols carried on data subcarriers in the group 2 are interchanged. Data symbols carried on data subcarriers in the group 3 and data symbols carried on data subcarriers in the group 4 are interchanged. For example, for all of the data subcarriers, data symbols carried on two specific data subcarriers are interchanged. Alternatively, when there is a one-to-one correspondence between coding bits obtained through channel coding and data symbols, each coding bit may correspond to one data subcarrier. Alternatively, before constellation point mapping, coding bits that are obtained through channel coding and that correspond to different data subcarriers may be changed correspondingly.

Optionally, for the CL-SIG field, based on the foregoing manner, data symbol carried on m data subcarriers may be point multiplied by an m-bit random sequence, to carry additional information. Optionally, a sequence value of the random sequence may be 1 or −1, but is not limited to the two values. Optionally, the m-bit random sequence is a sequence whose bits are all −1. Alternatively, in the m-bit random sequence, half of bits are 1, and the other half of bits are −1. Further, optionally, a data symbol carried on an odd-numbered data subcarrier may be multiplied by 1, and a data symbol carried on an even-numbered data subcarrier may be multiplied by −1. Alternatively, a data symbol carried on a data subcarrier in a high-frequency data subcarrier subset may be multiplied by 1, and a data symbol carried on a data subcarrier in a low-frequency data subcarrier subset may be multiplied by −1. Alternatively, a data symbol carried on an odd-numbered data subcarrier may be multiplied by −1, and a data symbol carried on an even-numbered data subcarrier may be multiplied by 1. Alternatively, a data symbol carried on a data subcarrier in a high-frequency data subcarrier subset may be multiplied by −1, and a data symbol carried on a data subcarrier in a low-frequency data subcarrier subset may be multiplied by 1.

Further, optionally, two values of the m-bit random sequence may be used to carry one-bit signal indicating a preamble. For example, a sequence whose bits are all 1 may be used to indicate that an EHT PPDU is a preamble puncturing EHT PPDU, and a sequence whose bits are all −1 may be used to indicate that an EHT PPDU is not a preamble puncturing EHT PPDU. Herein, a concept of preamble puncturing is similar to that of preamble puncturing of a PPDU in 802.11ax. For example, preamble puncturing may indicate that a preamble and a data field are not transmitted on a 20-MHz bandwidth of a bandwidth.

It should be noted that, in FIG. 5A to FIG. 5D, an example in which the repeated field is a $1^{st}$ field of the new physical layer preamble is used. Optionally, the repeated field may be alternatively a $2^{nd}$ field of the new physical layer preamble.

Optionally, the BPSK mode may be used for constellation point mapping in the second frequency-domain processing process.

Optionally, when the repeated field is the $1^{st}$ field of the new physical layer preamble, the repeated field uses an unrotated constellation point mapping mode (excluding QBPSK), for example, BPSK. When the repeated field is the $2^{nd}$ field of the new physical layer preamble, the repeated field may use a constellation point mapping mode such as BPSK or QBPSK. This is not limited.

Optionally, the foregoing plurality of auto-detection manners may be further used in combination with a manner in which a value of a length field in the L-SIG of the legacy preamble is exactly divided by 3. Alternatively, the foregoing plurality of auto-detection manners may be further used in combination with a manner in which a value of a length field in the L-SIG field of the legacy preamble is not exactly divided by 3.

It should be noted that, because an 802.11n receive end performs auto detection by determining a constellation point mapping mode used for a $1^{st}$ OFDM field following the L-SIG, when the $1^{st}$ field of the new physical layer preamble uses the QBPSK mode for constellation point mapping, the following problem may be caused. The 802.11n receive end determines, on the basis that the $1^{st}$ OFDM field following the L-SIG uses the QBPSK mode for constellation point mapping, that the PPDU is an HT PPDU, and if the PPDU is not an HT PPDU actually, the 802.11n receive end may incorrectly decode the $1^{st}$ field of the new physical layer preamble, for example, the 802.11n receive end fails to perform a cyclic redundancy check, and the 802.11n receive end does not comply with the length field of the L-SIG to enter a silent time period. As a result, this behavior may interfere with the PPDU that is being transmitted.

In this embodiment of this application, when the repeated field is the $1^{st}$ field of the new physical layer preamble, the repeated field uses an unrotated constellation point mapping mode (excluding QBPSK). This can prevent the 802.11n receive end from mistakenly determining a next-generation PPDU as an HT PPDU, thereby avoiding a dangerous behavior of not complying with the length field in the L-SIG.

It should be noted that, even though another receive end, for example, an 802.11a receive end, an 802.11ac receive end, or an 802.11ax receive end mistakenly determine, through auto-detection, the next-generation PPDU as an 802.11a PPDU, an 802.11ac VHT PPDU, or an 802.11ax HE PPDU respectively, the foregoing dangerous behavior that the 802.11n receive end does not comply with the length field in the L-SIG does not occur.

Optionally, when the repeated field is the $1^{st}$ field of the new physical layer preamble, any field of the new physical layer preamble other than the $1^{st}$ field uses the rotated BPSK mode for constellation point mapping. Any field of the new physical layer preamble other than the $1^{st}$ field uses the rotated BPSK mode for constellation point mapping such that the receive end can further determine, in an enhanced manner based on the constellation point mapping mode used for the field other than the $1^{st}$ field, whether a received PPDU is a next-generation PPDU. This improves accuracy of a determining result. Optionally, the field, other than the $1^{st}$ field, that uses the rotated BPSK mode for constellation point mapping may be the $2^{nd}$ field of the new physical layer preamble, for example, a $2^{nd}$ OFDM symbol of the new physical layer preamble.

It should be noted that, in the first frequency-domain processing process and the second frequency-domain processing process, information bits before channel coding may be the same, and information bits after channel coding may be the same or different. That is, in a frequency-domain processing process, a bit input to a channel encoder for the repeated field may be the same as a bit input to the channel encoder for the preset field of the legacy physical layer preamble, and specific channel coding modes may be the same or different.

It should be noted that, in this embodiment, IFFT may alternatively be replaced with inverse discrete Fourier transform (IDFT).

Step 402: The transmit end sends the PPDU.

In this step, optionally, the transmit end may send the PPDU in a broadcast or unicast manner.

Step 403: The receive end determines whether the new physical layer preamble of the PPDU includes the repeated field.

In this step, the repeated field is the field that has the preset out-of-order relationship with the preset field of the legacy physical layer preamble of the PPDU in frequency domain. For specific descriptions of the preset out-of-order relationship, refer to step 401. Details are not described herein again. If the new physical layer preamble includes the repeated field, the PPDU is a target PPDU, that is, a next-generation PPDU.

Optionally, determining whether the new physical layer preamble includes a repeated field may include determining a similarity between first information and second information, where the first information is obtained by performing a first decoding processing process on the preset field of the legacy physical layer preamble, and the second information is obtained by performing a second decoding processing process on the repeated field, and if the similarity is greater than or equal to a preset threshold, determining that the new physical layer preamble includes the repeated field, or if the similarity is less than a preset threshold, determining that the new physical layer preamble does not include the repeated field.

It should be noted that types of the first information and the second information may be types that can reflect the preset out-of-order relationship. The types of the first information and the second information are the same, for example, both are information bits or data symbols. The first decoding processing process and the second decoding processing process each may include all decoding processes, or may include a portion of decoding processes.

It should be noted that, if the similarity is less than the preset threshold, it is determined whether the new physical layer preamble includes information used for auto-detection of another 802.11 standard.

Corresponding to step 401, optionally, a relationship between the first decoding processing process and the second decoding processing process may include the following three types.

Type 1: The first decoding processing process includes de-interleaving processing, and the second decoding processing process does not include de-interleaving processing.

For example, the preset field of the legacy physical layer preamble is the L-SIG. The receive end may decode the L-SIG by performing a decoding processing process of an existing legacy preamble of the 802.11. When the receive end decodes a CL-SIG, after the receive end performs constellation point de-mapping, the receive end does not perform de-interleaving, but performs binary convolutional coding (BCC) channel decoding. Further, the receive end may compare a similarity between an information bit obtained by decoding the L-SIG and an information bit obtained by decoding the CL-SIG. If the similarity is greater than a preset threshold, the receive end determines that the PPDU is an EHT PPDU, or the similarity is less than or equal to a preset threshold, the receive end determines that the PPDU is not an EHT PPDU. Alternatively, the receive end may compare a similarity between a coding bit obtained by de-interleaving the L-SIG and a coding bit obtained by performing constellation point de-mapping on the CL-SIG. If the similarity is greater than a preset threshold, the receive end determines that the PPDU is an EHT PPDU, or the similarity is less than or equal to a preset threshold, the receive end determines that the PPDU is not an EHT PPDU.

Type 2: The first decoding processing process does not include de-scrambling processing, and the second decoding processing process includes de-scrambling processing.

For example, the preset field of the legacy physical layer preamble is the L-SIG. The receive end may compare a similarity between second information and first information, where the second information is obtained by performing de-scrambling processing or other processing (for example, channel decoding) after de-scrambling processing on the CL-SIG, and the first information is obtained by performing corresponding processing on the L-SIG. If the similarity is greater than a preset threshold, the receive end may determine that the PPDU is an EHT PPDU, or the similarity is less than or equal to a preset threshold, the receive end may determine that the PPDU is not an EHT PPDU.

Type 3: The first decoding processing process does not include de-out-of-order processing for a data symbol, and the second decoding processing process includes de-out-of-order processing for a data symbol.

Similar to step 401, de-out-of-order processing for a data symbol includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

For example, the preset field of the legacy physical layer preamble is the L-SIG. The receive end may compare a similarity between second information and first information, where the second information is obtained by performing de-out-of-order processing for a data symbol or other processing (for example, channel decoding) after de-out-of-order processing for a data symbol on the CL-SIG, and the first information is obtained by performing corresponding processing on the L-SIG. If the similarity is greater than a preset threshold, the receive end determines that the PPDU is an EHT PPDU, or the similarity is less than or equal to a preset threshold, the receive end determines that the PPDU is not an EHT PPDU. It should be noted that de-out-of-order processing for a data symbol in step 403 is reverse to out-of-order processing in step 401. For specific content of de-out-of-order processing for a data symbol, refer to out-of-order processing. Details are not described herein again.

Optionally, the foregoing plurality of auto-detection manners may be further used in combination with a manner in which a value of a length field in the L-SIG field of the legacy preamble is exactly divided by 3. Alternatively, the foregoing plurality of auto-detection manners may be further used in combination with a manner in which a value of a length field in the L-SIG field of the legacy preamble is not exactly divided by 3.

Optionally, after it is determined that the new physical layer preamble of the PPDU includes the repeated field, an information bit obtained by decoding the PPDU may be parsed based on a frame structure of the next-generation PPDU.

In this embodiment, the transmit end generates and sends the PPDU including the preamble, where the preamble includes the legacy physical layer preamble and the new physical layer preamble, the new physical layer preamble includes the repeated field, the repeated field is the field that has the preset out-of-order relationship with the preset field of the legacy physical layer preamble in frequency domain. The receive end determines whether the new physical layer preamble of the received PPDU includes the repeated field. If the PPDU includes the repeated field, the receive end determines that the PPDU is the target PPDU, that is, the next-generation PPDU. In this way, auto-detection of the physical layer preamble of the PPDU in the next-generation 802.11 standard is implemented. In addition, robustness of the preset field of the legacy physical layer preamble is enhanced by setting the repeated field. This provides a possibility of outdoor transmission.

Figure 6:
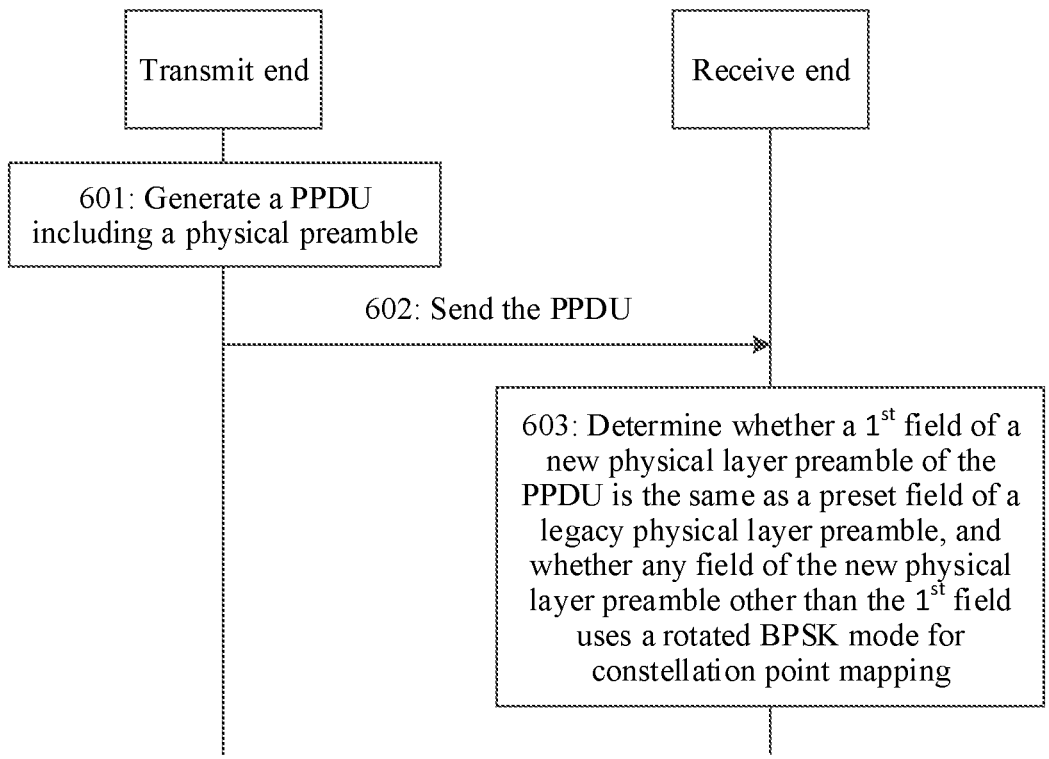
FIG. 6 is a flowchart of a communication method according to another embodiment of this application.

FIG. 6 is a flowchart of a communication method according to another embodiment of this application. As shown in FIG. 6, the method in this embodiment may include the following steps.

Step 601: A transmit end generates a PPDU including a physical preamble.

In this step, the physical preamble includes a legacy physical layer preamble and a new physical layer preamble. The legacy physical layer preamble includes the L-STF, the L-LTF, and the L-SIG in FIG. 3A to FIG. 3F, and can be decoded by a receive end that supports the 802.11a standard. The new physical layer preamble is different from the new physical layer preamble in FIG. 3B to FIG. 3F, and can be decoded by a receive end that supports a next-generation 802.11 standard. In consideration of compatibility, the receive end that supports the next-generation 802.11 standard can also support the 802.11a standard. Therefore, the legacy physical layer preamble can be decoded by a plurality of receive ends, and the new physical layer preamble can be decoded by a portion of the plurality of receive ends.

A $1^{st}$ field of the new physical layer preamble is the same as the preset field of the legacy physical layer preamble, and any field of the new physical layer preamble other than the $1^{st}$ field uses a rotated BPSK mode for constellation point mapping. Alternatively, a $2^{nd}$ field of the new physical layer preamble is the same as the preset field of the legacy preamble.

Optionally, the preset field of the legacy physical layer preamble may be any one of the L-STF, the L-LTF, or the L-SIG. For ease of implementation, the preset field of the legacy physical layer preamble may be the L-SIG.

It should be noted that, in this embodiment, the $1^{st}$ field of the new physical layer preamble is the same as the preset field of the legacy physical layer preamble, and any field of the new physical layer preamble other than the $1^{st}$ field uses the rotated BPSK mode for constellation point mapping, to carry information for automatically detecting that the PPDU is a next-generation PPDU. In addition to the $1^{st}$ field, the new physical layer preamble may further include a field, other than the $1^{st}$ field, used to carry a new function indication provided in the next-generation 802.11 standard. The new physical layer preamble may further include, for example, the field shown in FIG. 3H.

For example, the next-generation PPDU is an EHT PPDU, and the preset field of the legacy physical layer preamble is an L-SIG. A frame structure of the EHT PPDU may be shown in FIG. 7A. An RL-SIG is a field that is the same as the L-SIG in the new physical layer preamble.

Figure 7A:
FIG. 7A is a schematic diagram 2 of a frame structure of an EHT PPDU according to an embodiment of this application.

In FIG. 7A, further, any field of an EHT-SIG1, an EHT-SIG2, an EHT-STF, or an EHT-LTF uses a rotated BPSK mode for constellation point mapping, such as QBPSK.

It should be noted that, when any field other than the $1^{st}$ field uses the rotated BPSK mode for constellation point mapping, if the field includes a plurality of OFDM symbols, the plurality of OFDM symbols may use the rotated BPSK mode for constellation point mapping, or a portion of the plurality of OFDM symbols (for example, a $1^{st}$ OFDM symbol) may use the rotated BPSK mode for constellation point mapping. This may not be limited in this application. Optionally, a $1^{st}$ field following the RL-SIG may be QBPSK modulated, or a Pt OFDM symbol following the RL-SIG may be QBPSK modulated.

Optionally, the $2^{nd}$ field of the new physical layer preamble uses the rotated BPSK mode for constellation point mapping. The $2^{nd}$ field of the new physical layer preamble uses the rotated BPSK mode for constellation point mapping such that the receive end determine, as early as possible, that the PPDU is the next-generation PPDU.

Alternatively, in this embodiment, the $2^{nd}$ field (for example, a $2^{nd}$ OFDM symbol) of the physical layer preamble is the same as the preset field of the legacy preamble, and may carry information for automatically detecting that the PPDU is the next-generation PPDU. Correspondingly, the following step 603 may be replaced with the following: The receive end determines whether the $2^{nd}$ field of the new physical layer preamble of the received PPDU is the same as the preset field of the legacy physical layer preamble. Further, if the $2^{nd}$ field of the new physical layer preamble of the PPDU is the same as the preset field of the legacy physical layer preamble, the receive end determines that the PPDU is a target PPDU, that is, the next-generation PPDU. If the $2^{nd}$ field of the new physical layer preamble of the PPDU is different from the preset field of the legacy physical layer preamble, the receive end determines that the PPDU is not the target PPDU. Optionally, the $1^{st}$ field (for example, a $1^{st}$ OFDM symbol) of the new physical layer preamble is BPSK modulated. That is, symbols carried on all data subcarriers on the OFDM symbol are BPSK modulated.

For example, the next-generation PPDU is an EHT PPDU, and the preset field of the legacy physical layer preamble is an L-SIG. A frame structure of the EHT PPDU may be shown in FIG. 7B. An RL-SIG is a field that is the same as the L-SIG in the new physical layer preamble. In addition, the RL-SIG mentioned herein may alternatively be replaced with the CL-SIG in the foregoing embodiment.

Figure 7B:
FIG. 7B is a schematic diagram 3 of a frame structure of an EHT PPDU according to an embodiment of this application.

It should be noted that the RL-SIG in FIG. 7A and FIG. 7B is the same as the RL-SIG in FIG. 3E, and both are a repeat field of the L-SIG.

Step 602: The transmit end sends the PPDU.

In this step, optionally, the transmit end may send the PPDU in a broadcast or unicast manner.

Step 603: The receive end determines whether the $1^{st}$ field of the new physical layer preamble of the PPDU is the same as the preset field of the legacy physical layer preamble, and whether any field of the new physical layer preamble other than the $1^{st}$ field uses the rotated BPSK mode for constellation point mapping.

In this step, if the $1^{st}$ field of the new physical layer preamble of the PPDU is the same as the preset field of the legacy physical layer preamble, and any field of the new physical layer preamble other than the $1^{st}$ field uses the rotated BPSK mode for constellation point mapping, the receive end determines that the PPDU is a target PPDU, that is, the next-generation PPDU. If the $1^{st}$ field of the new physical layer preamble of the PPDU is different from the preset field of the legacy physical layer preamble, or any field of the new physical layer preamble other than the $1^{st}$ field does not use the rotated BPSK mode for constellation point mapping, the receive end determines that the frame structure of the PPDU is not a frame structure of the next-generation PPDU.

Optionally, for example, the legacy physical layer preamble such as the L-SIG or the EHT-SIG 1 uses the QBPSK mode for constellation point mapping. The receive end may first decode the RL-SIG, and then compare a similarity between the RL-SIG and the L-SIG. If the similarity is greater than a threshold, the receive end continues to determine whether the EHT-SIG 1 uses the QBPSK mode for constellation point mapping, that is, compares whether a difference obtained by subtracting I-axis energy from Q-axis energy is greater than a threshold. If the similarity is greater than the threshold and the EHT-SIG 1 uses the QBPSK mode for constellation point mapping, the receive end determines that the received PPDU is an EHT PPDU. If the similarity is greater than the threshold but the EHT-SIG 1 does not use the QBPSK mode for constellation point mapping, the receive end determines that the received PPDU is an 802.11ax HE PPDU.

Optionally, the foregoing plurality of auto-detection manners may be further used in combination with a manner in which a value of a length field in the L-SIG field of the legacy preamble is exactly divided by 3. Alternatively, the foregoing plurality of auto-detection manners may be further used in combination with a manner in which a value of a length field in the L-SIG field of the legacy preamble is not exactly divided by 3.

It should be noted that, if an 802.11ax receive end receives the PPDU in step 601, the 802.11ax receive end may determine, by comparing the similarity between the RL-SIG and the L-SIG, that the received PPDU is the 802.11ax HE PPDU. However, because the PPDU is not an HE PPDU, even if the 802.11ax receive end incorrectly performs decoding, the PPDU is not affected.

Optionally, after the 802.11ax receive end determines that the PPDU is not the next-generation PPDU, the 802.11ax receive end may further determine whether the PPDU is another PPDU, for example, whether the PPDU is a VHT PPDU.

Optionally, after the 802.11ax receive end determines that the PPDU is the next-generation PPDU, the 802.11ax receive end may parse, based on the frame structure of the next-generation PPDU, an information bit obtained by decoding the PPDU.

In this embodiment, the transmit end generates and sends the PPDU including the preamble, where the preamble includes the legacy physical layer preamble and the new physical layer preamble, the $1^{st}$ field of the new physical layer preamble is the same as the preset field of the legacy physical layer preamble, and any field of the new physical layer preamble other than the $1^{st}$ field uses the rotated BPSK mode for constellation point mapping. The receive end determines whether the $1^{st}$ field of the new physical layer preamble of the received PPDU is the same as the preset field of the legacy physical layer preamble, and whether any field of the new physical layer preamble other than the $1^{st}$ field uses the rotated BPSK mode for constellation point mapping. If the $1^{st}$ field of the new physical layer preamble of the received PPDU is the same as the preset field of the legacy physical layer preamble, and any field of the new physical layer preamble other than the $1^{st}$ field uses the rotated BPSK mode for constellation point mapping, the receive end determines that the PPDU is the target PPDU, that is, the next-generation PPDU. In this way, auto-detection of the physical layer preamble of the PPDU in the next-generation 802.11 standard is implemented.

Figure 8:
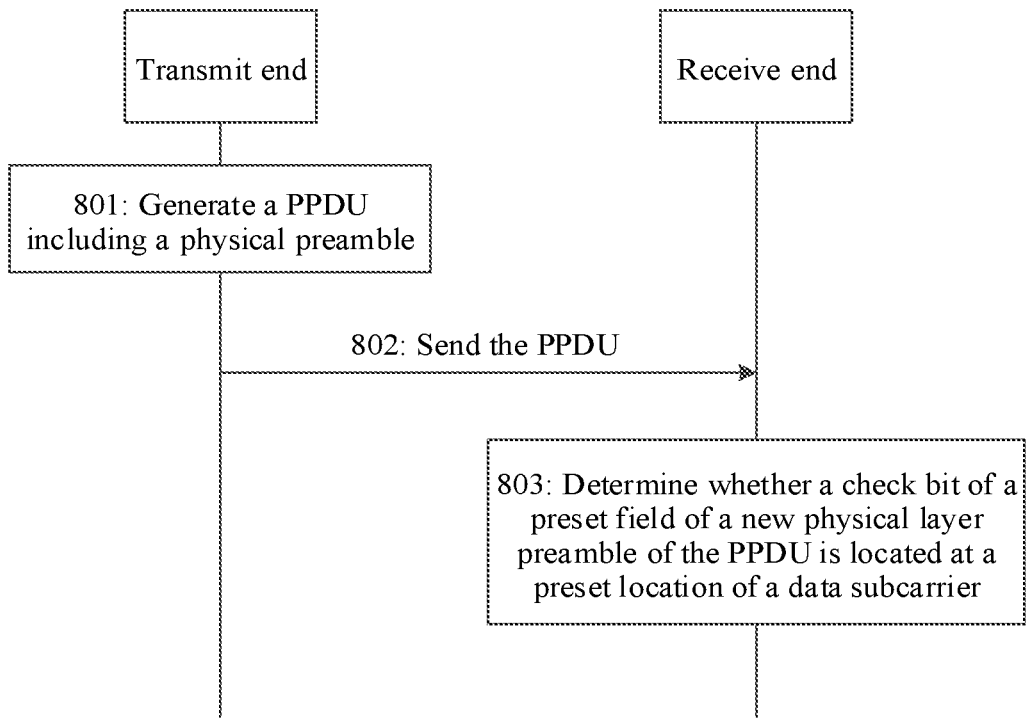
FIG. 8 is a flowchart of a communication method according to still another embodiment of this application.

FIG. 8 is a flowchart of a communication method according to still another embodiment of this application. As shown in FIG. 8, the method in this embodiment may include the following steps.

Step 801: A transmit end generates a PPDU including a preamble.

In this step, the preamble includes a new physical layer preamble. The new physical layer preamble includes a preset field, a check bit of the preset field is located at a preset location of a data subcarrier, and the preset location is used to indicate a frame structure of the PPDU.

It should be noted that, in this embodiment, the check bit of the preset field is located at the preset location of the data subcarrier, to carry information for automatically detecting that the PPDU is a next-generation PPDU. The preset field may be further used to carry a new function indication provided in a next-generation 802.11 standard. For example, the PPDU is an EHT PPDU. The preset field may be the EHT-SIG1 in the fields shown in FIG. 3H, or may be the EHT-SIG1 shown in FIG. 5 or FIG. 7.

In a current technology, the check bit in the PPDU is located at a specific location of a data subcarrier. To be specific, the check bit is located after a data subcarrier carrying data signal and before a tail bit used for BCC decoding. The preset location in this embodiment may be any location other than the specific location, to be different from the location of the check bit in the current technology in order to carry the information for automatically detecting that the PPDU is the next-generation PPDU. Optionally, the preset location is a start location of the data subcarrier.

Optionally, the preset field may be a $1^{st}$ field or a $2^{nd}$ field of the new physical layer preamble.

It should be noted that, when the preset field includes a plurality of OFDM symbols, check bits of the plurality of OFDM symbols may be all located at the preset location of the data subcarrier, or check bits of a portion of the plurality of OFDM symbols may be located at the preset location of the data subcarrier. This may not be limited in this application.

Optionally, the method in this embodiment may be combined with the method embodiment shown in FIG. 4. Further, on the basis that the next-generation PPDU is indicated using a repeated field in the embodiment shown in FIG. 4, that the location of the check bit of the preset field of the new physical layer preamble is the preset location may be further used to indicate the next-generation PPDU. Correspondingly, a receive end needs to determine whether the new physical layer preamble of the PPDU includes the repeated field, and also needs to determine whether the location of the check bit of the preset field of the new physical layer preamble is the preset location. If the new physical layer preamble includes the repeated field, and the location of the check bit of the preset field of the new physical layer preamble is the preset location, the receive end determines that the frame structure of the PPDU is a frame structure of the next-generation PPDU, that is, the receive end determines that the PPDU is the next-generation PPDU.

Optionally, the method in this embodiment may be combined with the method embodiment shown in FIG. 6. Further, on the basis that the $1^{st}$ field of the new physical layer preamble is the same as a preset field of a legacy preamble and that any field of the new physical layer preamble other than the $1^{st}$ field uses a rotated BPSK mode for constellation point mapping to indicate the next-generation PPDU in the embodiment shown in FIG. 6, that the location of the preset field of the new physical layer preamble is the preset location may be further used to indicate the next-generation PPDU. Correspondingly, the receive end needs to determine whether the $1^{st}$ field of the new physical layer preamble in the PPDU is the same as the preset field of the legacy preamble, and whether any field of the new physical layer preamble other than the $1^{st}$ field uses the rotated BPSK mode for constellation point mapping, and also needs to determine whether the location of the check bit of the preset field of the new physical layer preamble is the preset location. If the $1^{st}$ field of the new physical layer preamble is the same as the preset field of the legacy preamble, any field of the new physical layer preamble other than the $1^{st}$ field uses the rotated BPSK mode for constellation point mapping, and the location of the check bit of the preset field of the new physical layer preamble is the preset location, the receive end determines that the frame structure of the PPDU is a frame structure of the next-generation PPDU.

Optionally, in the method in this embodiment, on the basis that if the $1^{st}$ field of the new physical layer preamble is the same as the preset field of the legacy preamble, it indicates that the PPDU is the HE PPDU or the next-generation PPDU, that the location of the check bit of the preset field of the new physical layer preamble is the preset location may be further used to indicate the next-generation PPDU. Correspondingly, the receive end needs to determine whether the $1^{st}$ field of the new physical layer preamble of the PPDU is the same as the preset field of the new physical layer preamble, and also needs to determine whether the location of the check bit of the preset field of the new physical layer preamble is the preset location. If the $1^{st}$ field of the new physical layer preamble of the PPDU is the same as the preset field of the new physical layer preamble, and the location of the check bit of the preset field of the new physical layer preamble is the preset location, the receive end determines that the frame structure of the PPDU is a frame structure of the next-generation PPDU.

It should be noted that the PPDU may further include a legacy physical layer preamble. The legacy physical layer preamble includes the L-STF, the L-LTF, and the L-SIG in FIG. 3A to FIG. 3F, and can be decoded by a receive end that supports the 802.11a standard. The new physical layer preamble is different from the new physical layer preamble in FIG. 3B to FIG. 3F, and can be decoded by a receive end that supports the next-generation 802.11 standard. In consideration of compatibility, the receive end that supports the next-generation 802.11 standard can also support the 802.11a standard. Therefore, the legacy physical layer preamble can be decoded by a plurality of receive ends, and the new physical layer preamble can be decoded by a portion of the plurality of receive ends.

Step 802: The transmit end sends the PPDU.

In this step, optionally, the transmit end may send the PPDU in a broadcast or unicast manner.

Step 803: The receive end determines whether the check bit of the preset field of the new physical layer preamble of the PPDU is located at the preset location of the data subcarrier.

In this step, if the check bit of the preset field of the new physical layer preamble of the PPDU is located at the preset location of the data subcarrier, for example, if a CRC field at the preset location is selected to check the decoded preset field and the check succeeds, the receive end determines that the PPDU is a target PPDU, that is, the next-generation PPDU. If the check bit of the preset field of the new physical layer preamble of the PPDU is not located at the preset location of the data subcarrier, for example, if a CRC field at the preset location is selected to check the decoded preset field but the check fails, the receive end determines that the frame structure of the PPDU is not the frame structure of the next-generation PPDU.

Optionally, the receive end may extract the check bit from the decoded preset field (EHT-SIG1) based on the preset location, and then perform a check (for example, perform a cyclic redundancy check (CRC)) on an information bit. If the check succeeds, the receive end determines that the received PPDU is the next-generation PPDU.

Optionally, after the receive end determines that the PPDU is not the next-generation PPDU, the receive end may further determine whether the PPDU is another PPDU, for example, whether the PPDU is a VHT PPDU.

Optionally, after the receive end determines that the PPDU is the next-generation PPDU, the receive end may parse, based on the frame structure of the next-generation PPDU, an information bit obtained by decoding the PPDU.

In this embodiment, the transmit end generates and sends the PPDU including the preamble, where the preamble includes the new physical layer preamble, the new physical layer preamble includes the preset field, the check bit of the preset field is located at the preset location of the data subcarrier, and the preset location is used to indicate the frame structure of the PPDU. The receive end determines whether the check bit of the preset field of the new physical layer preamble of the received PPDU is located at the preset location of the data subcarrier. If the check bit in the preset field of the new physical layer preamble is located at the preset location of the data subcarrier, the receive end determines that the PPDU is the target PPDU, that is, the next-generation PPDU. In this way, auto-detection of the physical layer preamble of the PPDU in the next-generation 802.11 standard is implemented.

Optionally, the foregoing plurality of auto-detection manners may be further used in combination with a manner in which a value of a length field in the L-SIG field of the legacy preamble is exactly divided by 3. Alternatively, the foregoing plurality of auto-detection manners may be further used in combination with a manner in which a value of a length field in the L-SIG field of the legacy preamble is not exactly divided by 3.

It should be noted that the foregoing plurality of automatic detection manners may be freely combined to implement automatic detection of the next-generation PPDU.

It should be noted that the repeated field, the $1^{st}$ field, the field other than the $1^{st}$ field, the preset field of the legacy physical layer preamble, and the preset field of the new physical layer preamble each may be understood as an OFDM symbol. Further, the $1^{st}$ field may be a $1^{st}$ OFDM symbol, the $2^{nd}$ field may be understood as a $2^{nd}$ OFDM symbol, and the field other than the $1^{st}$ field may be understood as an OFDM symbol other than the $1^{st}$ OFDM symbol. For example, the field other than the $1^{st}$ field may be understood as the $2^{nd}$ OFDM symbol. Alternatively, the repeated field, the $1^{st}$ field, the field other than the $1^{st}$ field, the preset field of the legacy physical layer preamble, and the preset field of the new physical layer preamble each may be understood as a field that is constituted by one or more OFDM symbols. For example, the L-LTF includes two OFDM symbols, and the L-SIG includes one OFDM symbol.

Optionally, in all of the foregoing embodiments, the transmit end may further add, to the L-SIG of the PPDU in frequency domain, data symbols carried on four subcarriers, and set the data symbols to special values, to further carry the information for automatically detecting that the PPDU is the next-generation PPDU. Optionally, the four subcarriers may be two subcarriers that are additionally added on two sides of 52 used subcarriers (which may include 48 data subcarriers and four pilot subcarriers). Numbers of the four subcarriers may be [−28 −27 27 28]. Special values of the data symbols carried on the four subcarriers ranked from a low frequency to a high frequency may be values, other than [−1 −1 −1 −1 1] in the 802.11ax standard, for example, [−1 −1 −1 −1] and [1 −1 −1 −1].

Figure 9:
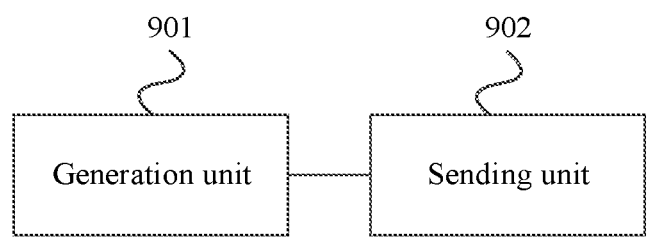
FIG. 9 is a schematic structural diagram of a communication apparatus according to an embodiment of this application.

FIG. 9 is a schematic structural diagram of a communication apparatus according to an embodiment of this application. The communication apparatus provided in this embodiment may be used for a transmit end. As shown in FIG. 9, the communication apparatus in this embodiment may include a generation unit 901 and a sending unit 902.

The generation unit 901 is configured to generate a PPDU including a preamble, where the preamble includes a legacy physical layer preamble and a new physical layer preamble, the new physical layer preamble includes a repeated field, and the repeated field is a field that has a preset out-of-order relationship with a preset field of the legacy physical layer preamble in frequency domain.

The sending unit 902 is configured to send the PPDU.

In a possible implementation design, a first frequency-domain processing process of generating an OFDM symbol of the preset field of the legacy physical layer preamble includes interleaving processing, and a second frequency-domain processing process of generating an OFDM symbol of the repeated field does not include interleaving processing, or the first frequency-domain processing process does not include scrambling processing, and the second frequency-domain processing process includes scrambling processing, or the first frequency-domain processing process does not include out-of-order processing for a data symbol, and the second frequency-domain processing process includes out-of-order processing for a data symbol.

In a possible implementation design, out-of-order processing includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

In a possible implementation design, a BPSK mode is used for constellation point mapping in the second frequency-domain processing process.

In a possible implementation design, the legacy physical layer preamble can be decoded by a plurality of receive ends, and the new physical layer preamble can be decoded by a portion of the plurality of receive ends.

In a possible implementation design, a bit input to a channel encoder for the repeated field is the same as a bit input to the channel encoder for the preset field of the legacy physical layer preamble in a frequency-domain processing process.

In a possible implementation design, the preset field of the legacy physical layer preamble is an L-SIG field.

In a possible implementation design, the repeated field is a $1^{st}$ field or a $2^{nd}$ field of the new physical layer preamble.

In a possible implementation design, the repeated field is a $1^{st}$ field of the new physical layer preamble, and any field of the new physical layer preamble other than the $1^{st}$ field uses a rotated BPSK mode for constellation point mapping.

The communication apparatus provided in this embodiment may be configured to execute the technical solutions on the transmit end side in the embodiment shown in FIG. 4. Implementation principles and technical effects thereof are similar, and details are not described herein again.

Figure 10:
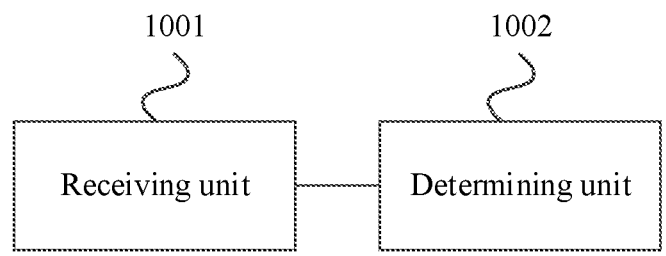
FIG. 10 is a schematic structural diagram of a communication apparatus according to another embodiment of this application.

FIG. 10 is a schematic structural diagram of a communication apparatus according to another embodiment of this application. The communication apparatus provided in this embodiment may be used for a receive end. As shown in FIG. 10, the communication apparatus in this embodiment may include a receiving unit 1001 and a determining unit 1002.

The receiving unit 1001 is configured to receive a PPDU including a preamble, where the preamble includes a legacy physical layer preamble and a new physical layer preamble.

The determining unit 1002 is configured to determine whether the new physical layer preamble includes a repeated field, where the repeated field is a field that has a preset out-of-order relationship with a preset field of the legacy physical layer preamble in frequency domain, and if the new physical layer preamble includes the repeated field, determine that the PPDU is a target PPDU.

In a possible implementation design, that the determining unit is configured to determine whether the new physical layer preamble includes a repeated field further includes determining a similarity between first information and second information, where the first information is obtained by performing a first decoding processing process on the preset field of the legacy physical layer preamble, and the second information is obtained by performing a second decoding processing process on the repeated field, and if the similarity is greater than or equal to a preset threshold, determining that the new physical layer preamble includes the repeated field, or if the similarity is less than a preset threshold, determining that the new physical layer preamble does not include the repeated field.

In a possible implementation design, the first decoding processing process includes de-interleaving processing, and the second decoding processing process does not include de-interleaving processing, or the first decoding processing process does not include de-scrambling processing, and the second decoding processing process includes de-scrambling processing, or the first decoding processing process does not include de-out-of-order processing for a data symbol, and the second decoding processing process includes de-out-of-order processing for a data symbol.

In a possible implementation design, de-out-of-order processing for a data symbol includes any one of performing cyclic shift on data symbols carried on data subcarriers, interchanging data symbols carried on odd-numbered and even-numbered data subcarriers, and interchanging data symbols carried in high-frequency and low-frequency data subcarrier subsets.

The communication apparatus provided in this embodiment may be configured to execute the technical solutions on the receive end side in the embodiment shown in FIG. 4. Implementation principles and technical effects thereof are similar, and details are not described herein again.

An embodiment of this application further provides a communication apparatus, used for a transmit end. A structure of the communication apparatus is similar to the structure shown in FIG. 9, and the communication apparatus may also include a generation unit and a sending unit.

The generation unit is configured to generate a PPDU including a preamble, where the preamble includes a legacy physical layer preamble and a new physical layer preamble, a $1^{st}$ field of the new physical layer preamble is the same as a preset field of the legacy physical layer preamble, and any field of the new physical layer preamble other than the $1^{st}$ field uses a rotated BPSK mode for constellation point mapping.

The sending unit is configured to send the PPDU.

In a possible implementation design, a $2^{nd}$ field of the new physical layer preamble uses the rotated BPSK mode for constellation point mapping.

The communication apparatus provided in this embodiment may be configured to execute the technical solutions on the transmit end side in the embodiment shown in FIG. 6. Implementation principles and technical effects thereof are similar, and details are not described herein again.

An embodiment of this application further provides a communication apparatus, used for a receive end. A structure of the communication apparatus is similar to the structure shown in FIG. 10, and the communication apparatus may also include a receiving unit and a determining unit.

The receiving unit is configured to receive a PPDU including a preamble, where the preamble includes a legacy physical layer preamble and a new physical layer preamble.

The determining unit is configured to determine whether a $1^{st}$ field of the new physical layer preamble is the same as a preset field of the legacy physical layer preamble, and whether any field of the new physical layer preamble other than the $1^{st}$ field uses a rotated BPSK mode for constellation point mapping, and if the $1^{st}$ field of the new physical layer preamble is the same as the preset field of the legacy physical layer preamble, and any field of the new physical layer preamble other than the $1^{st}$ field uses a rotated BPSK mode for constellation point mapping, determine that the PPDU is a target PPDU.

In a possible implementation design, determining whether any field of the new physical layer preamble other than the $1^{st}$ field uses a rotated BPSK mode for constellation point mapping includes determining whether a $2^{nd}$ field of the new physical layer preamble uses the rotated BPSK mode for constellation point mapping.

The communication apparatus provided in this embodiment may be configured to execute the technical solutions on the receive end side in the embodiment shown in FIG. 6. Implementation principles and technical effects thereof are similar, and details are not described herein again.

An embodiment of this application further provides a communication apparatus, used for a transmit end. A structure of the communication apparatus is similar to the structure shown in FIG. 9, and the communication apparatus may also include a generation unit and a sending unit.

The generation unit is configured to generate a PPDU including a new physical layer preamble, where the new physical layer preamble includes a preset field, a check bit of the preset field is located at a preset location of a data subcarrier, and the preset location is used to indicate a frame structure of the PPDU.

The sending unit is configured to send the PPDU.

In a possible implementation design, the preset location is a start location of the data subcarrier.

In a possible implementation design, the preset field is a $1^{st}$ field or a $2^{nd}$ field of the new physical layer preamble.

The communication apparatus provided in this embodiment may be configured to execute the technical solutions on the transmit end side in the embodiment shown in FIG. 8. Implementation principles and technical effects thereof are similar, and details are not described herein again.

An embodiment of this application further provides a communication apparatus, used for a receive end. A structure of the communication apparatus is similar to the structure shown in FIG. 10, and the communication apparatus may also include a receiving unit and a determining unit.

The receiving unit is configured to receive a PPDU including a preamble, where the preamble includes a new physical layer preamble.

The determining unit is configured to determine whether a check bit of a preset field of the new physical layer preamble is located at a preset location of a data subcarrier, where the preset location is used to indicate that the PPDU is a target PPDU, and if the check bit of the preset field of the new physical layer preamble is located at the preset location of the data subcarrier, determine that the PPDU is the target PPDU.

In a possible implementation design, the preset location is a start location of the data subcarrier.

In a possible implementation design, the preset field is a $1^{st}$ field or a $2^{nd}$ field of the new physical layer preamble.

The communication apparatus provided in this embodiment may be configured to execute the technical solutions on the receive end side in the embodiment shown in FIG. 8. Implementation principles and technical effects thereof are similar, and details are not described herein again.

It should be noted that division to the foregoing units of the communication apparatus is merely division into logical functions. In actual implementation, all or some of the units may be integrated into one physical entity, or may be physically separated. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, the sending unit may be a processing element disposed separately, or may be implemented in a chip of the communication apparatus. In addition, the sending unit may be stored in a memory of the communication apparatus in a form of a program, and invoked by a processing element of the communication apparatus to perform a function of the sending unit. Implementation of other units is similar to the implementation of the sending unit. In addition, some or all of the units may be integrated together, or the units may be implemented independently. The processing element herein may be an integrated circuit having a signal processing capability. In an implementation process, the steps in the foregoing method or the foregoing units can be implemented using a hardware integrated logic circuit in the processing element or using instructions in a form of software. In addition, the sending unit is a unit for controlling sending, and may receive information through a transmit apparatus of the communication apparatus, such as an antenna and a radio frequency apparatus.

The foregoing units may be configured as one or more integrated circuits for implementing the foregoing method, for example, one or more application-specific integrated circuits (ASIC), one or more microprocessors (such as a digital signal processor (DSP)), one or more field-programmable gate arrays (FPGA), or the like. For another example, when one of the foregoing units is implemented by a processing element invoking a program, the processing element may be a general-purpose processor, such as a central processing unit (CPU) or another processor that can invoke a program. For another example, the units may be integrated together and implemented as a system-on-a-chip (SOC).

Figure 11:
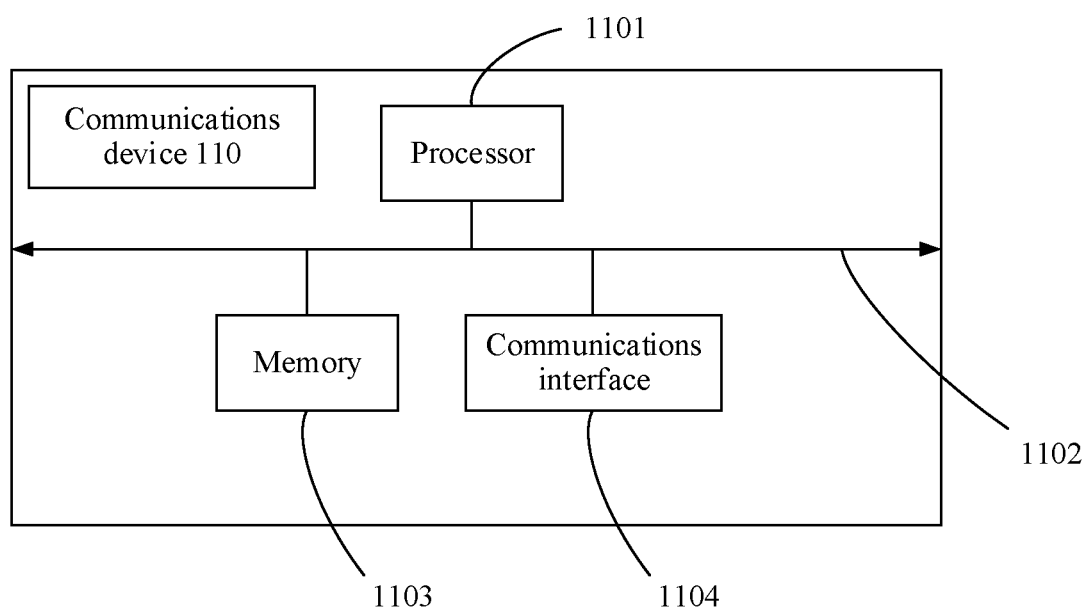
FIG. 11 is a schematic diagram of a hardware structure of a communication device according to an embodiment of this application.

FIG. 11 is a schematic diagram of a hardware structure of a communication device 110 according to an embodiment of this application. The communication device 110 includes at least one processor 1101, a communication bus 1102, a memory 1103, and at least one communication interface 1104.

The processor 1101 may be a general-purpose CPU, a microprocessor, an ASIC, or one or more integrated circuits that are configured to control execution of a program in a solution of this application.

The communication bus 1102 may include a channel on which information is transmitted between the foregoing components.

The communication interface 1104 is any apparatus of a transceiver type, and is configured to communicate with another device or a communication network, for example, the Ethernet, a radio access network (RAN), or a WLANs.

The memory 1103 may be a read-only memory (ROM) or another type of static storage device capable of storing static information and instructions, or a random-access memory (RAM) or another type of dynamic storage device capable of storing information and instructions, or may be an electrically erasable programmable ROM (EEPROM), a compact disc (CD) ROM (CD-ROM) or another CD storage, an optical disc storage (including a compressed optical disc, a laser disc, an optical disc, a digital versatile (DVD) disc, a BLU-RAY DISC, or the like), a magnetic disk storage medium or another magnetic storage device, or any other medium capable of carrying or storing expected program code in a form of an instruction or a data structure and capable of being accessed by a computer. However, this is not limited thereto. The memory may exist independently, and is connected to the processor through the bus. The memory may alternatively be integrated with the processor.

The memory 1103 is configured to store application program code used for executing the solution of this application, and the processor 1101 controls the execution. The processor 1101 is configured to execute the application program code stored in the memory 1103, to implement the communication methods provided in the foregoing embodiments of this application.

Alternatively, optionally, in this embodiment of this application, the processor 1101 may perform processing related functions in the communication methods provided in the foregoing embodiments in this application, and the communication interface 1104 is responsible for communication with another device or a communication network. This is not further limited in this embodiment of this application.

In specific implementation, in an embodiment, the processor 1101 may include one or more CPUs.

In specific implementation, in an embodiment, the communication device 110 may include a plurality of processors. Each of the processors may be a single-core (single-CPU) processor, or may be a multi-core (multi-CPU) processor. The processor herein may be one or more devices, circuits, and/or processing cores for processing data (for example, a computer program instruction).

In specific implementation, in an embodiment, the communication device 110 may further include an output device and an input device. The output device communicates with the processor 1101, and may display information in a plurality of manners. For example, the output device may be a liquid-crystal display (LCD), a light-emitting diode (LED) display device, a cathode-ray tube (CRT) display device, a projector, or the like. The input device communicates with the processor 1101, and may receive user input in a plurality of manners. For example, the input device may be a mouse, a keyboard, a touchscreen device, or a sensor device.

In addition, as described above, the communication device 110 provided in this embodiment of this application may be a chip, a transmit end, a receive end, or a device having a structure similar to that of the device shown in FIG. 11. A type of the communication device 110 is not limited in this embodiment of this application.

In this embodiment, the communication device 110 is presented with the function modules implemented through integration. The "module" herein may be an ASIC, a circuit, a processor executing one or more software or firmware programs, a memory, an integrated logic circuit, and/or another component that can provide the foregoing function. In a simple embodiment, a person skilled in the art may figure out that the communication device 110 may be in the form shown in FIG. 11. For example, functions/implementation processes of the units in FIG. 9 and FIG. 10 may be implemented by the processor 1101 and the memory 1103 in FIG. 11. Further, the generation unit in FIG. 9 may be executed by the processor 1101 by invoking the application program code stored in the memory 1103. This is not limited in this embodiment of this application. Alternatively, the sending unit in FIG. 9 may be implemented by the communication interface 1104 in FIG. 11. This is not limited in this embodiment of this application.

It should be noted that the communication device provided in the embodiment shown in FIG. 11 may be further the transmit end in the embodiment shown in FIG. 4, FIG. 6, or FIG. 8. When invoking the program stored in the memory 1103, the processor 1101 may perform the method, on the transmit end side, provided in the embodiment shown in FIG. 4, FIG. 6, or FIG. 8.

It should be noted that the communication device provided in the embodiment shown in FIG. 11 may be further the receive end in the embodiment shown in FIG. 4, FIG. 6, or FIG. 8. When invoking the program stored in the memory 1103, the processor 1101 may perform the method, on the receive end side, provided in the embodiment shown in FIG. 4, FIG. 6, or FIG. 8.

Optionally, an embodiment of this application provides a communication system. The communication system may include the communication apparatus or the communication device described in any one of the foregoing embodiments.

All or some of the foregoing embodiments may be implemented using software, hardware, firmware, or any combination thereof in the foregoing embodiments. When a software program is used to implement the embodiments, all or some of the embodiments may be implemented in a form of a computer program product. The computer program product includes one or more computer instructions. When the computer instructions are loaded and executed on a computer, the procedures or functions according to the embodiments of this application are completely or partially generated. The computer may be a general-purpose computer, a special-purpose computer, a computer network, or another programmable apparatus. The computer instruction may be stored in a computer-readable storage medium or may be transmitted from one computer-readable storage medium to another computer-readable storage medium. For example, the computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A communication apparatus, comprising:
    a processor configured to generate a physical layer protocol data unit (PPDU) comprising a preamble, wherein the preamble comprises a legacy physical layer preamble and a second physical layer preamble, wherein the legacy physical layer preamble comprises a preset field, and wherein the second physical layer preamble comprises a repeated field that has a preset out-of-order relationship with the preset field in a frequency domain; and
    a transmitter coupled to the processor and configured to send the PPDU.

2. The communication apparatus of claim 1, wherein the processor is further configured to:
    generate, using a first frequency-domain processing process, a first orthogonal frequency-division multiplexing (OFDM) symbol of the preset field; and
    generate, using a second frequency-domain processing process, a second OFDM symbol of the repeated field, wherein the first frequency-domain processing process comprises an interleaving processing and the second frequency-domain processing process does not comprise the interleaving processing, the first frequency-domain processing process does not comprise a scrambling processing and the second frequency-domain processing process comprises the scrambling processing, or the first frequency-domain processing process does not comprise an out-of-order processing for a data symbol and the second frequency-domain processing process comprises the out-of-order processing for the data symbol.

3. The communication apparatus of claim 2, wherein the processor is further configured to perform the out-of-order processing at least in part by:
    performing a cyclic shift on first data symbols carried on data subcarriers;
    interchanging second data symbols carried on odd-numbered data subcarriers with third data symbols carried on even-numbered data subcarriers; or
    interchanging fourth data symbols carried in a high-frequency data subcarrier subset with fifth data symbols carried in a low-frequency data subcarrier subset.

4. The communication apparatus of claim 2, wherein the processor is further configured to use a binary phase-shift keying (BPSK) mode for a constellation point mapping in the second frequency-domain processing process.

5. The communication apparatus of claim 1, wherein the legacy physical layer preamble is decodable by a plurality of receive ends, and wherein the second physical layer preamble is decodable by a portion of the receive ends.

6. The communication apparatus of claim 1, wherein, in a frequency-domain processing process, a first bit input to a channel encoder for the repeated field is the same as a second bit input to the channel encoder for the preset field.

7. The communication apparatus of claim 1, wherein the preset field is a legacy signal (L-SIG) field.

8. The communication apparatus of claim 1, wherein the repeated field is a first field of the second physical layer preamble or a second field of the second physical layer preamble.

9. The communication apparatus of claim 1, wherein the repeated field is a first field of the second physical layer preamble, and wherein the processor is further configured to use a rotated binary phase-shift keying (BPSK) mode for a constellation point mapping on any field of the second physical layer preamble other than the first field.

10. A communication apparatus, comprising:
a receiver configured to receive a physical layer protocol data unit (PPDU) comprising a preamble, wherein the preamble comprises a legacy physical layer preamble and a second physical layer preamble, and wherein the legacy physical layer preamble comprises a preset field; and
a processor coupled to the receiver and configured to:
determine whether the second physical layer preamble comprises a repeated field that has a preset out-of-order relationship with the preset field in a frequency domain; and
determine that the PPDU is a target PPDU when the second physical layer preamble comprises the repeated field.

11. The communication apparatus of claim 10, wherein the processor is further configured to:
obtain first information by performing a first decoding processing process on the preset field;
obtain second information by performing a second decoding processing process on the repeated field;
determine a similarity between the first information and the second information;
determine that the second physical layer preamble comprises the repeated field when the similarity is greater than or equal to a preset threshold; and
determine that the second physical layer preamble does not comprise the repeated field when the similarity is less than the preset threshold.

12. The communication apparatus of claim 11, wherein:
the first decoding processing process comprises a de-interleaving processing, and the second decoding processing process does not comprise the de-interleaving processing;
the first decoding processing process does not comprise a de-scrambling processing, and the second decoding processing process comprises the de-scrambling processing; or
the first decoding processing process does not comprise a de-out-of-order processing for a data symbol, and the second decoding processing process comprises the de-out-of-order processing for the data symbol.

13. The communication apparatus of claim 12, wherein the processor is further configured to perform the de-out-of-order processing for the data symbol at least in part by:
performing a cyclic shift on first data symbols carried on data subcarriers;
interchanging second data symbols carried on odd-numbered even-numbered data subcarriers with third data symbols carried on even-numbered data subcarriers; or
interchanging fourth data symbols carried in a high-frequency data subcarrier subset with fifth data symbols carried in a low-frequency data subcarrier subset.

14. A communication method, comprising:
generating a physical layer protocol data unit (PPDU) comprising a preamble, wherein the preamble comprises a legacy physical layer preamble and a second physical layer preamble, wherein the legacy physical layer preamble comprises a preset field, and wherein the second physical layer preamble comprises a repeated field that has a preset out-of-order relationship with the preset field in a frequency domain; and
sending the PPDU.

15. The method of claim 14, further comprising:
generating, using a first frequency-domain processing process, a first orthogonal frequency-division multiplexing (OFDM) symbol of the preset field; and
generating, using a second frequency-domain processing process, a second OFDM symbol of the repeated field,
wherein the first frequency-domain processing process comprises an interleaving processing, and the second frequency-domain processing process does not comprise the interleaving processing; the first frequency-domain processing process does not comprise a scrambling processing, and the second frequency-domain processing process comprises the scrambling processing; or the first frequency-domain processing process does not comprise an out-of-order processing for a data symbol, and the second frequency-domain processing process comprises the out-of-order processing for the data symbol.

16. The method of claim 15, wherein the out-of-order processing comprises:
performing a cyclic shift on first data symbols carried on data subcarriers;
interchanging second data symbols carried on odd-numbered data subcarriers with third data symbols carried on even-numbered data subcarriers; or
interchanging fourth data symbols carried in a high-frequency data subcarrier subset with fifth data symbols carried in a low-frequency data subcarrier subset.

17. The method of claim 15, further comprising using a binary phase-shift keying (BPSK) mode for a constellation point mapping in the second frequency-domain processing process.

18. The method of claim 14, wherein the legacy physical layer preamble can be decoded by a plurality of receive ends, and wherein the second physical layer preamble can be decoded by a portion of the receive ends.

19. The method of claim 14, wherein, in a frequency-domain processing process, a first bit input to a channel encoder for the repeated field is the same as a second bit input to the channel encoder for the preset field.

20. The method of claim 14, wherein the preset field is a legacy signal (L-SIG) field.

* * * * *